(12) United States Patent
Plante

(10) Patent No.: US 7,827,751 B2
(45) Date of Patent: Nov. 9, 2010

(54) MOISTURE BARRIER UNDERLAYMENT WITH INTERMEDIATE LAYER TO ACCOMMODATE EXPANSION AND CONTRACTION

(76) Inventor: Rejean Plante, C.P. 461, Drummondville, Quebec (CA) J2B 6W4

( * ) Notice: Subject to any disclaimer, the term of this patent is extended or adjusted under 35 U.S.C. 154(b) by 953 days.

(21) Appl. No.: 10/599,685

(22) PCT Filed: Apr. 6, 2005

(86) PCT No.: PCT/CA2005/000521

§ 371 (c)(1),
(2), (4) Date: Oct. 5, 2006

(87) PCT Pub. No.: WO2005/098155

PCT Pub. Date: Oct. 20, 2005

(65) Prior Publication Data

US 2007/0227090 A1    Oct. 4, 2007

Related U.S. Application Data

(60) Provisional application No. 60/560,332, filed on Apr. 6, 2004.

(51) Int. Cl.
*E04B 5/00* (2006.01)
(52) U.S. Cl. .................... 52/403.1; 52/409; 52/573.1
(58) Field of Classification Search .............. 52/105, 52/403.1, 409, 573.1
See application file for complete search history.

(56) References Cited

U.S. PATENT DOCUMENTS

| | | | | |
|---|---|---|---|---|
| 388,700 | A * | 8/1888 | Manahan | 52/105 |
| 1,939,004 | A * | 12/1933 | Fischer | 52/518 |
| 2,008,244 | A * | 7/1935 | Crooks | 52/403.1 |
| 2,354,725 | A * | 8/1944 | Weyerhaeuser | 52/783.1 |
| 2,872,882 | A * | 2/1959 | Paul | 52/408 |
| 3,111,787 | A * | 11/1963 | Chamberlain | 52/409 |
| 3,885,075 | A | 5/1975 | Ferrante | |
| 3,962,504 | A | 6/1976 | Sherwin | |
| 4,471,012 | A | 9/1984 | Maxwell | |
| 5,968,630 | A * | 10/1999 | Foster | 52/408 |
| 6,189,279 | B1 * | 2/2001 | Fiechtl | 52/403.1 |
| 7,146,771 | B2 * | 12/2006 | Swann | 52/408 |
| 2004/0031225 | A1 | 2/2004 | Fowler | |

* cited by examiner

*Primary Examiner*—Richard E Chilcot, Jr.
*Assistant Examiner*—Matthew J Smith
(74) *Attorney, Agent, or Firm*—Goudreau Gage Dubuc; Hugh Mansfield

(57) ABSTRACT

A sound and/or moisture barrier underlayment suited for use on a roof or floor surface to provide a substantially flat and level surface, comprises at least first and second strips of insulation membranes (10) laid down one next to the other in a coplanar relationship. The first and second strips (24, 26) have a thickness W1. An overlap joint (28) is provided between the first and second strips (24, 26). The overlap joint (28) has a thickness W2 substantially equal to or less than W1 to provide a free-bump transition between the first and second strips (24, 26) while preventing straight-through infiltration.

10 Claims, 28 Drawing Sheets

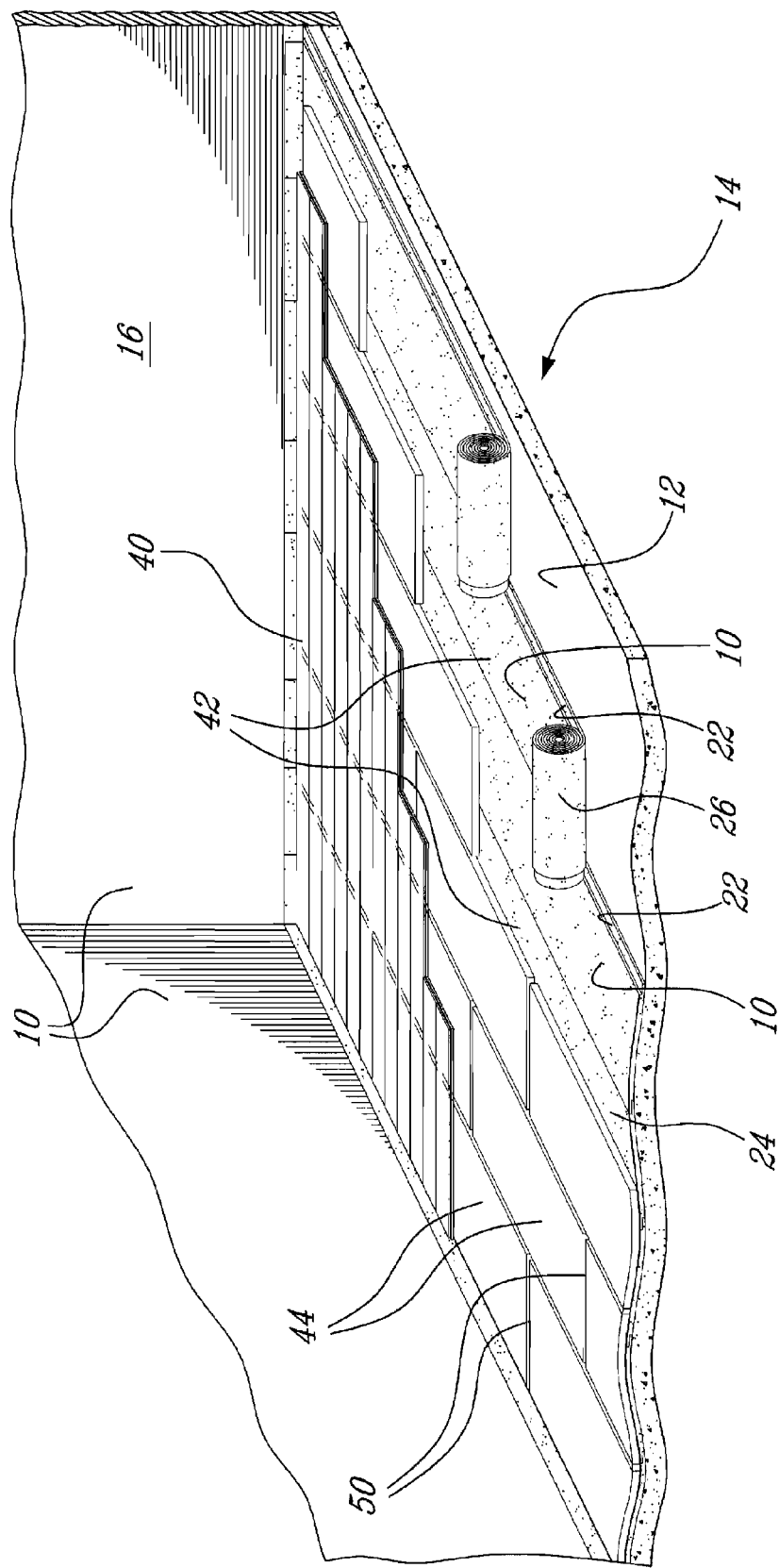

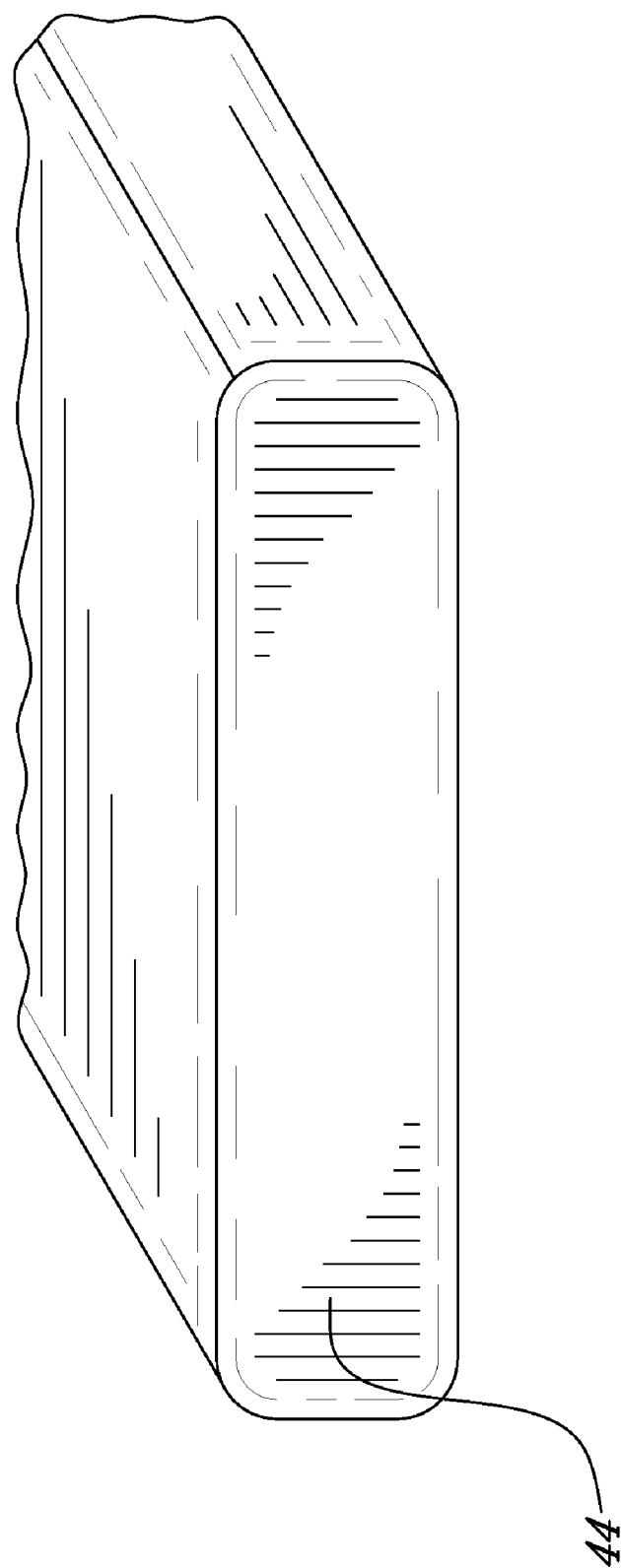

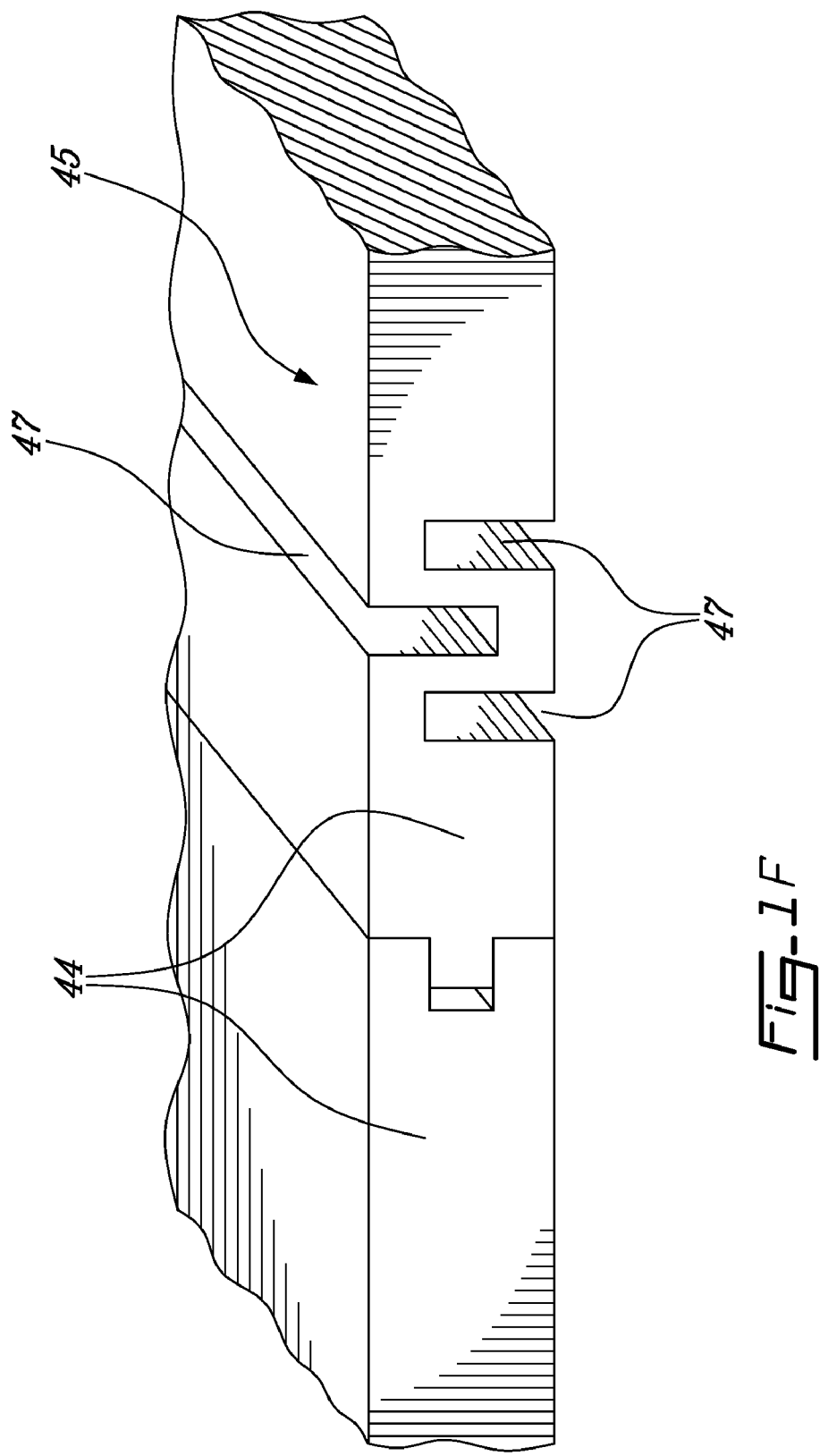

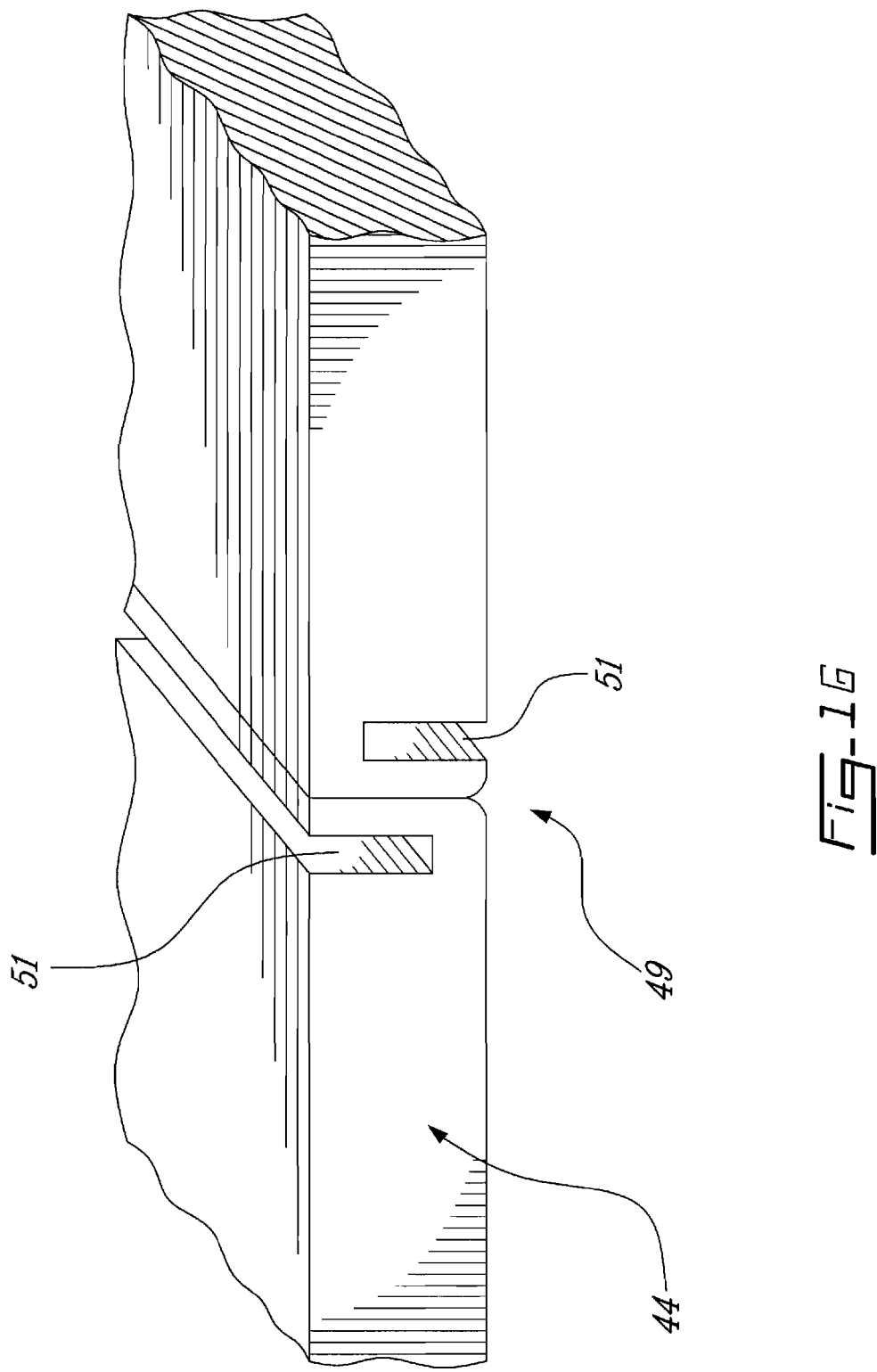

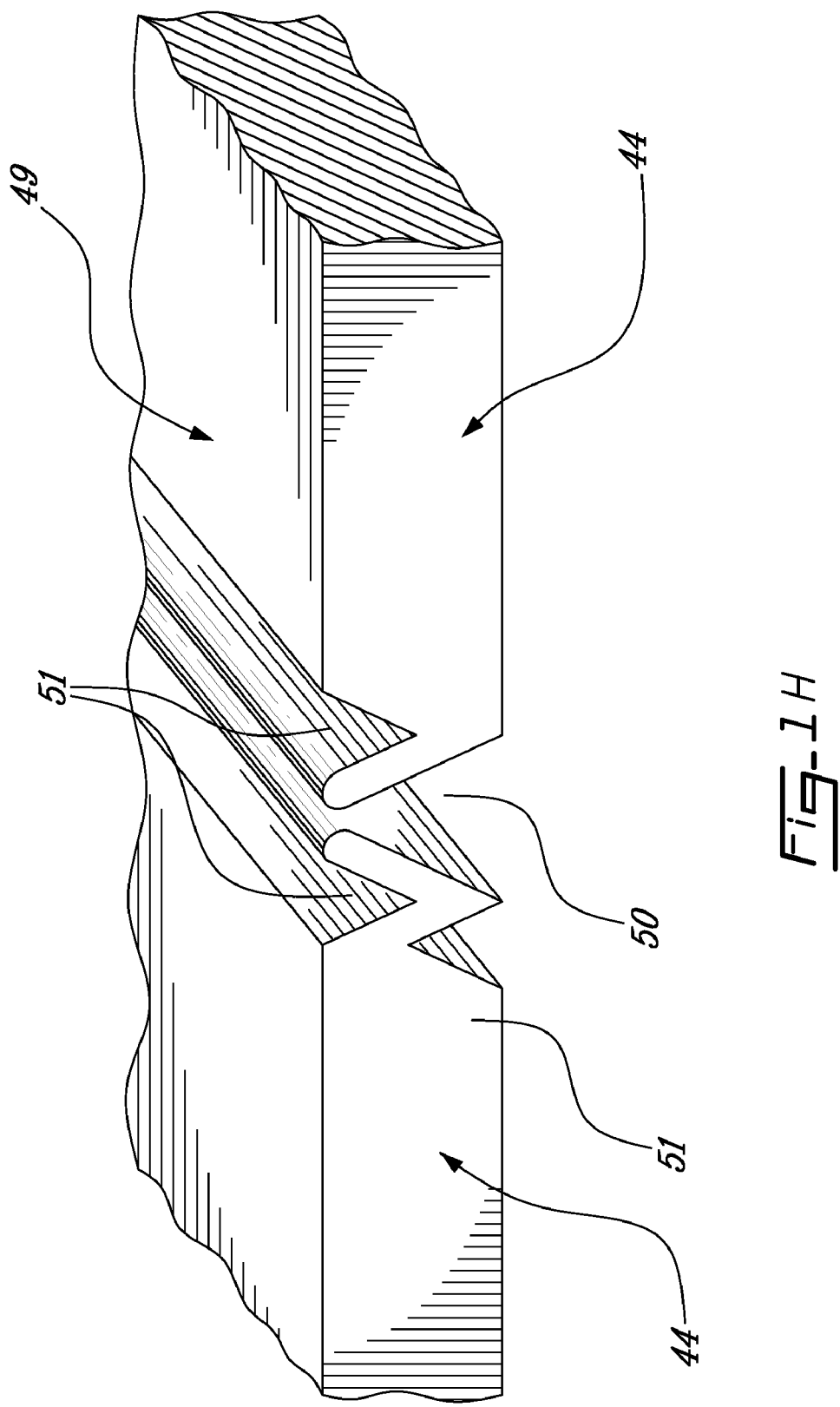

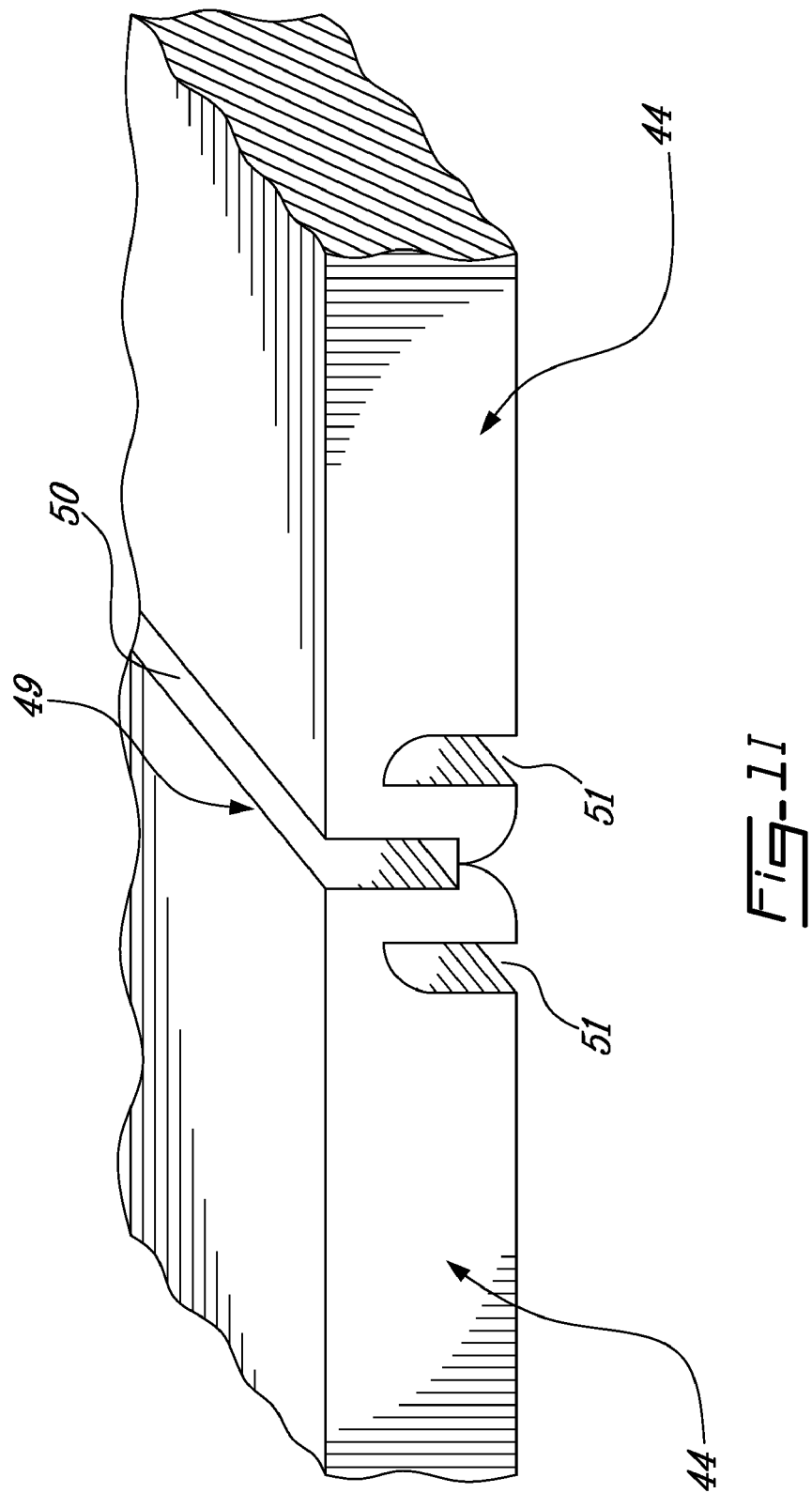

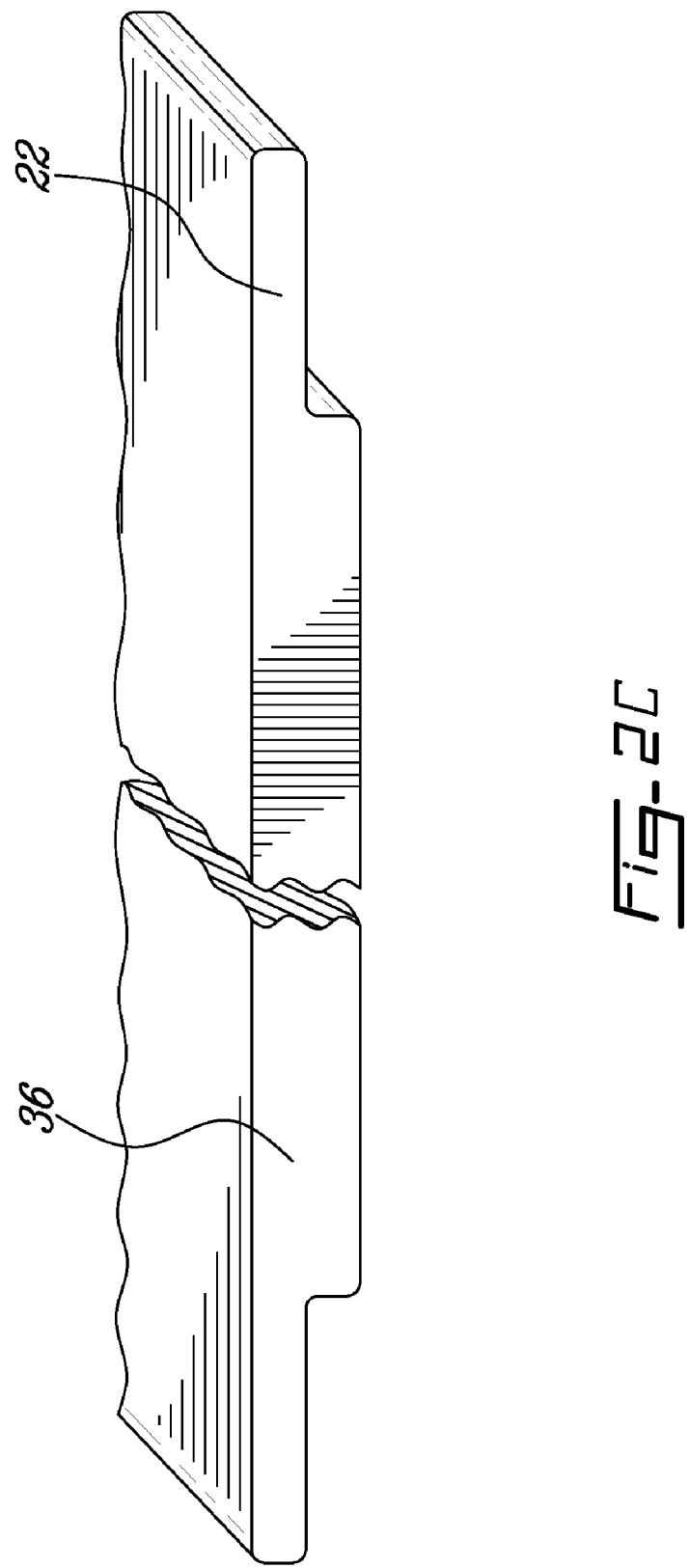

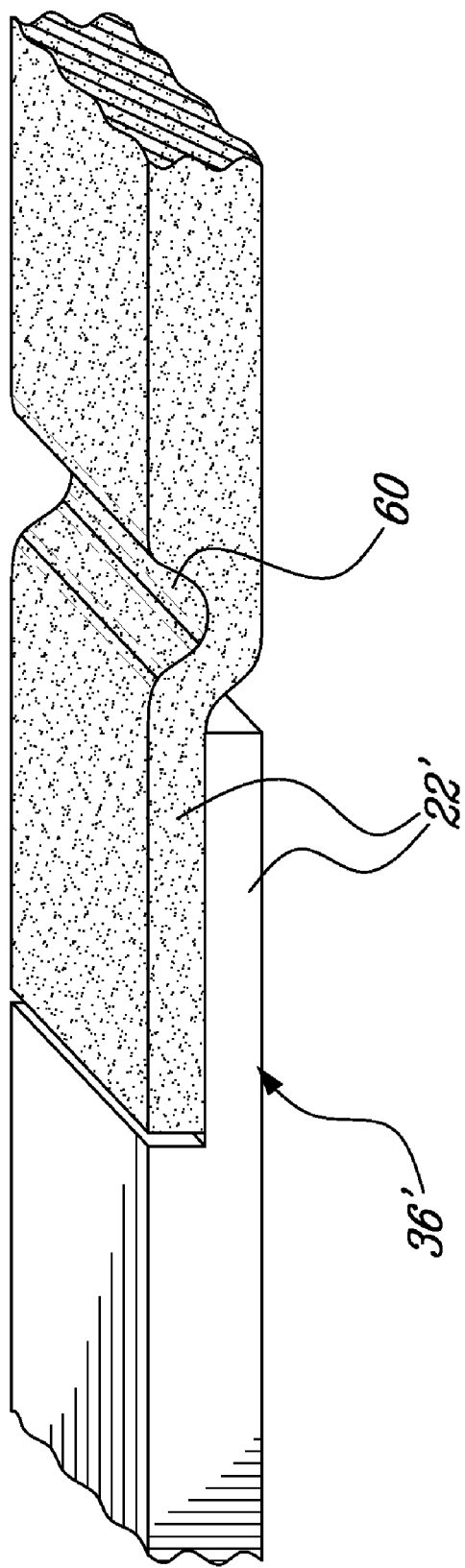

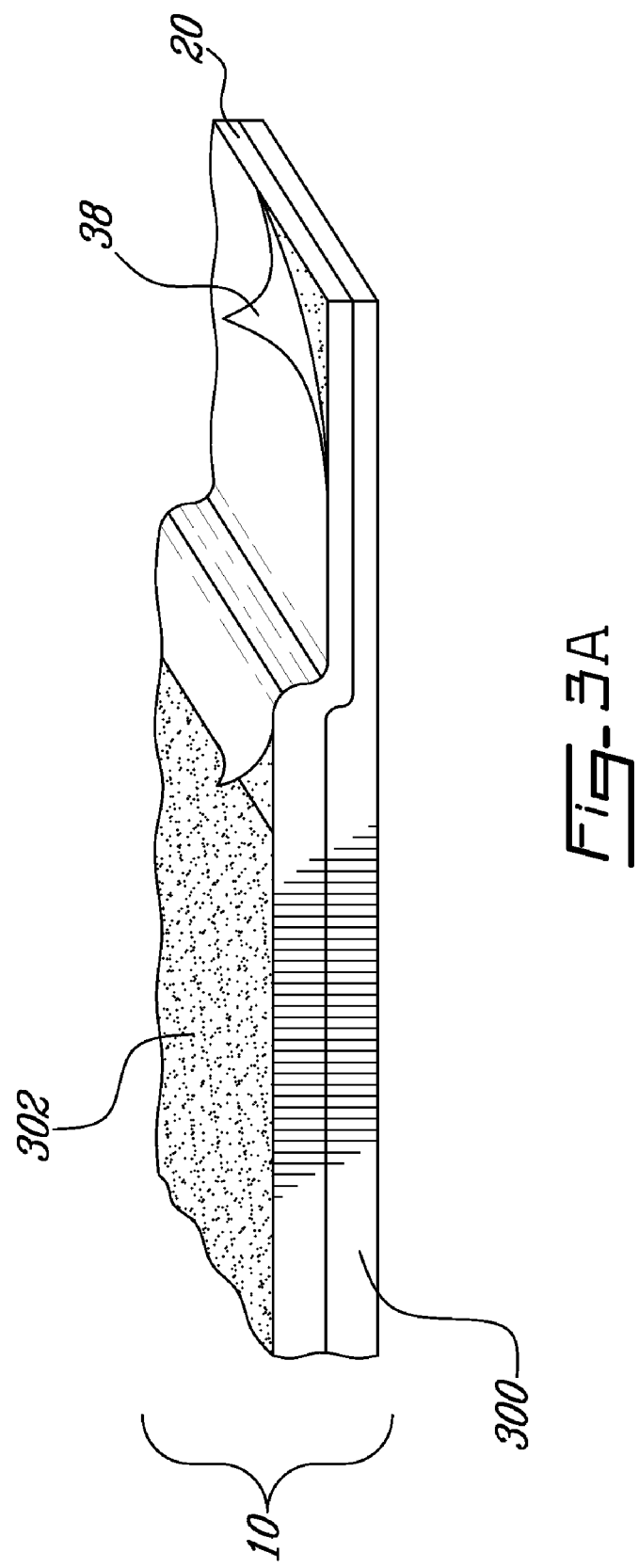

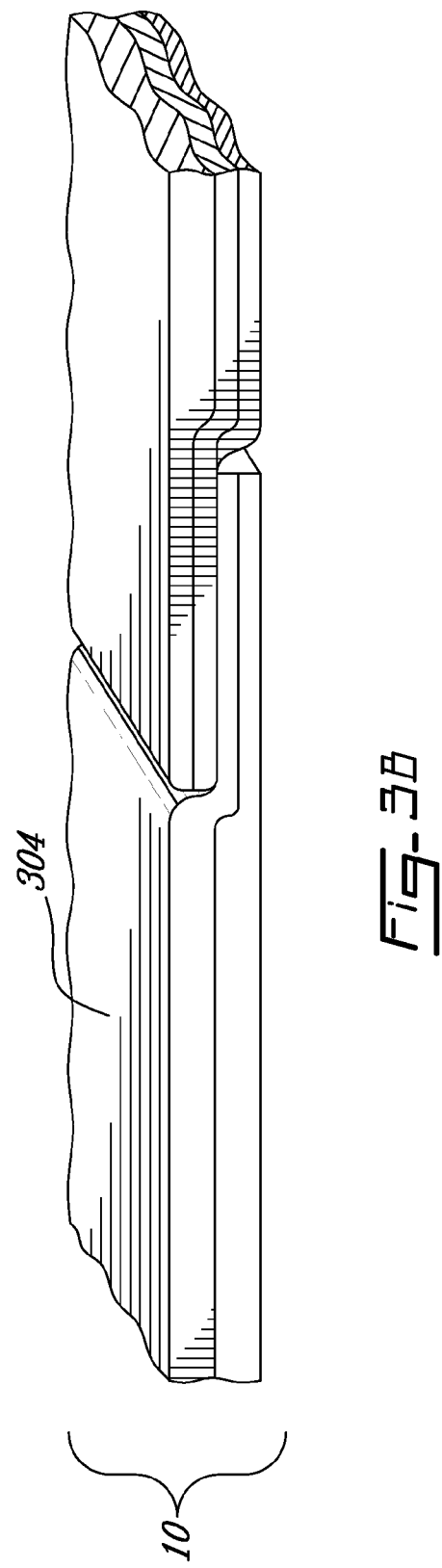

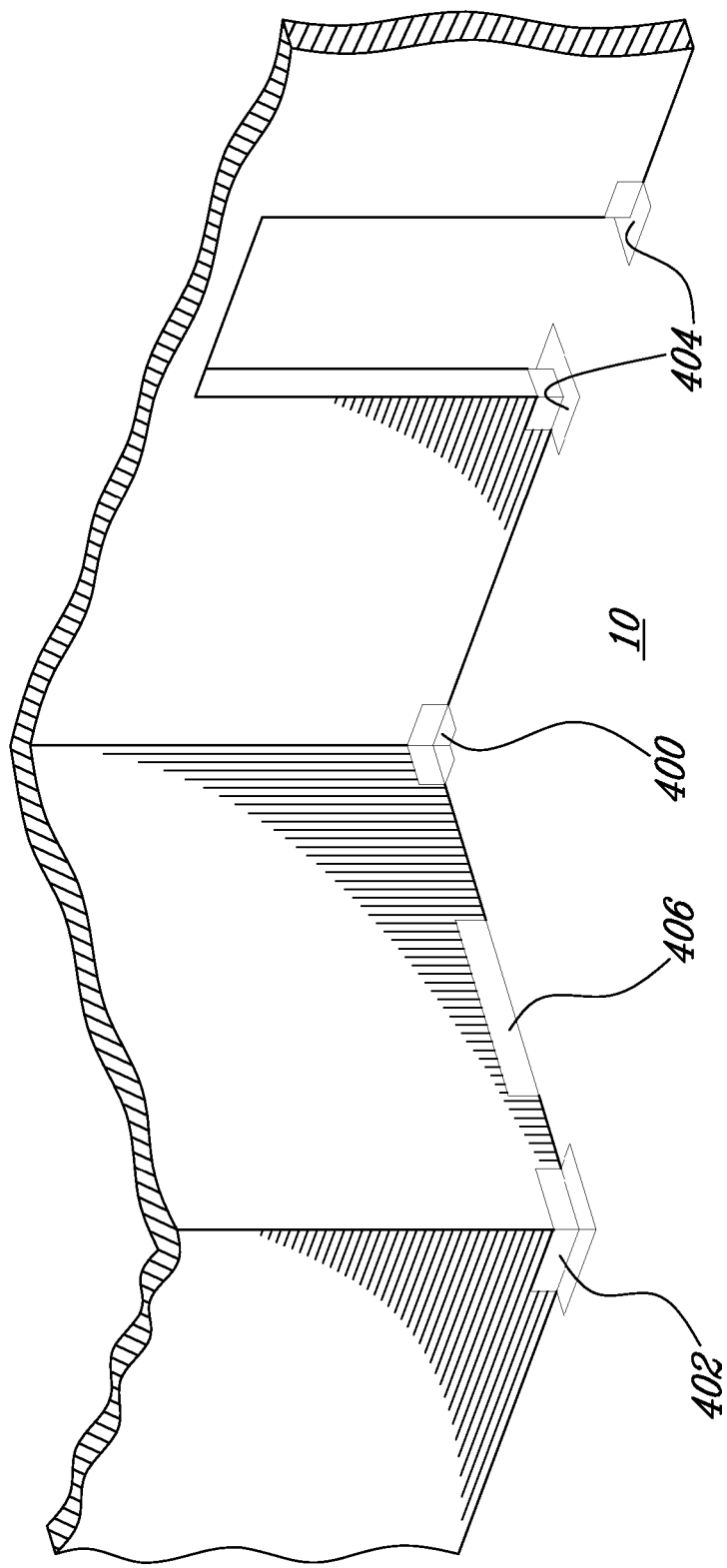

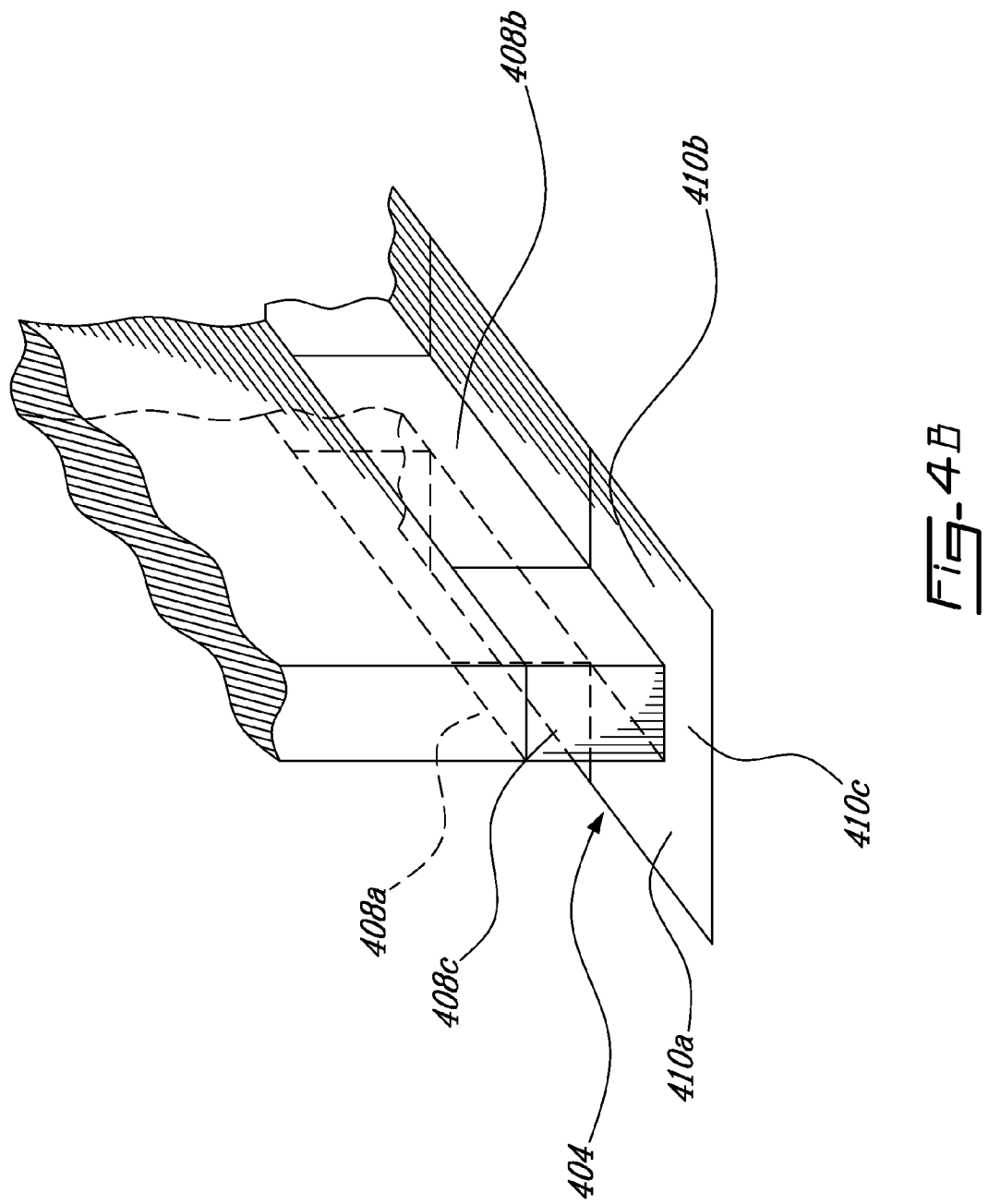

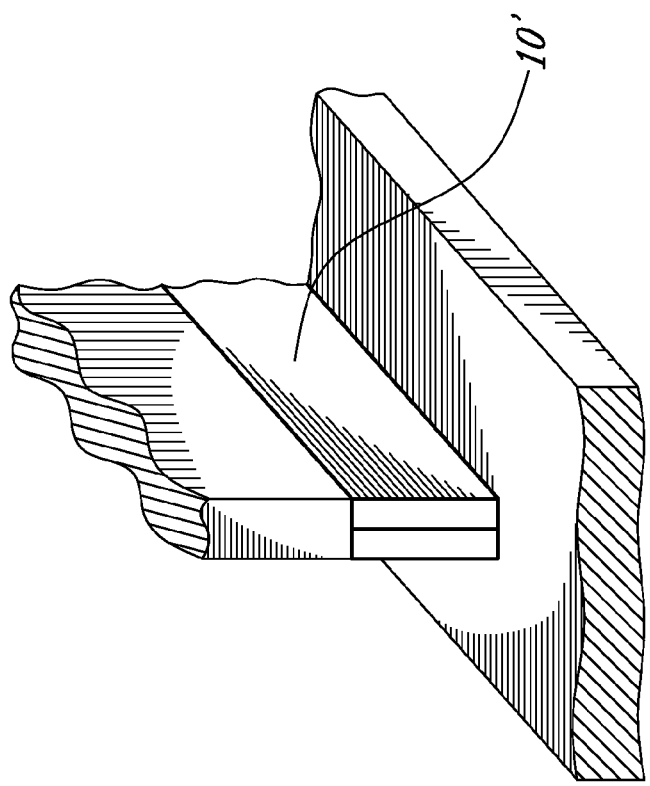
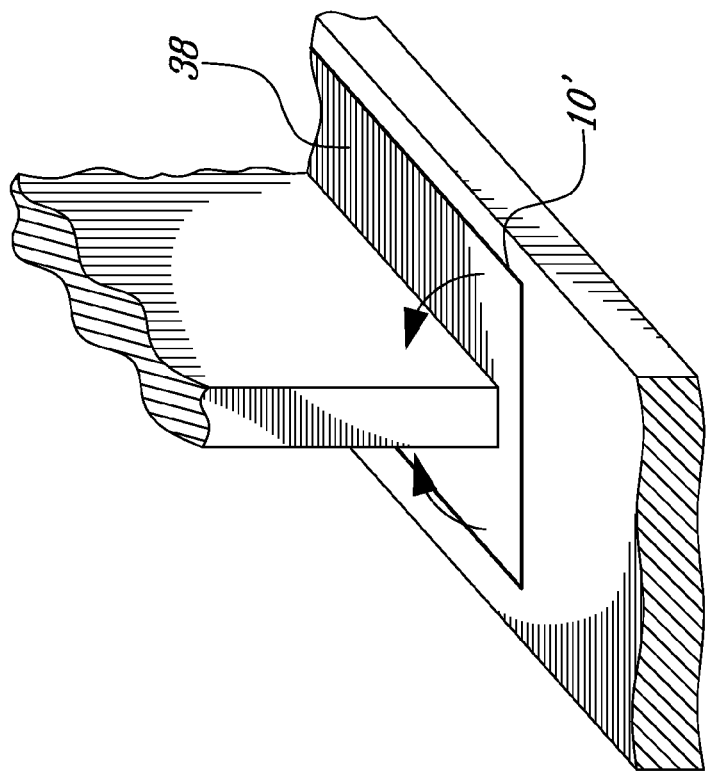
Fig-40

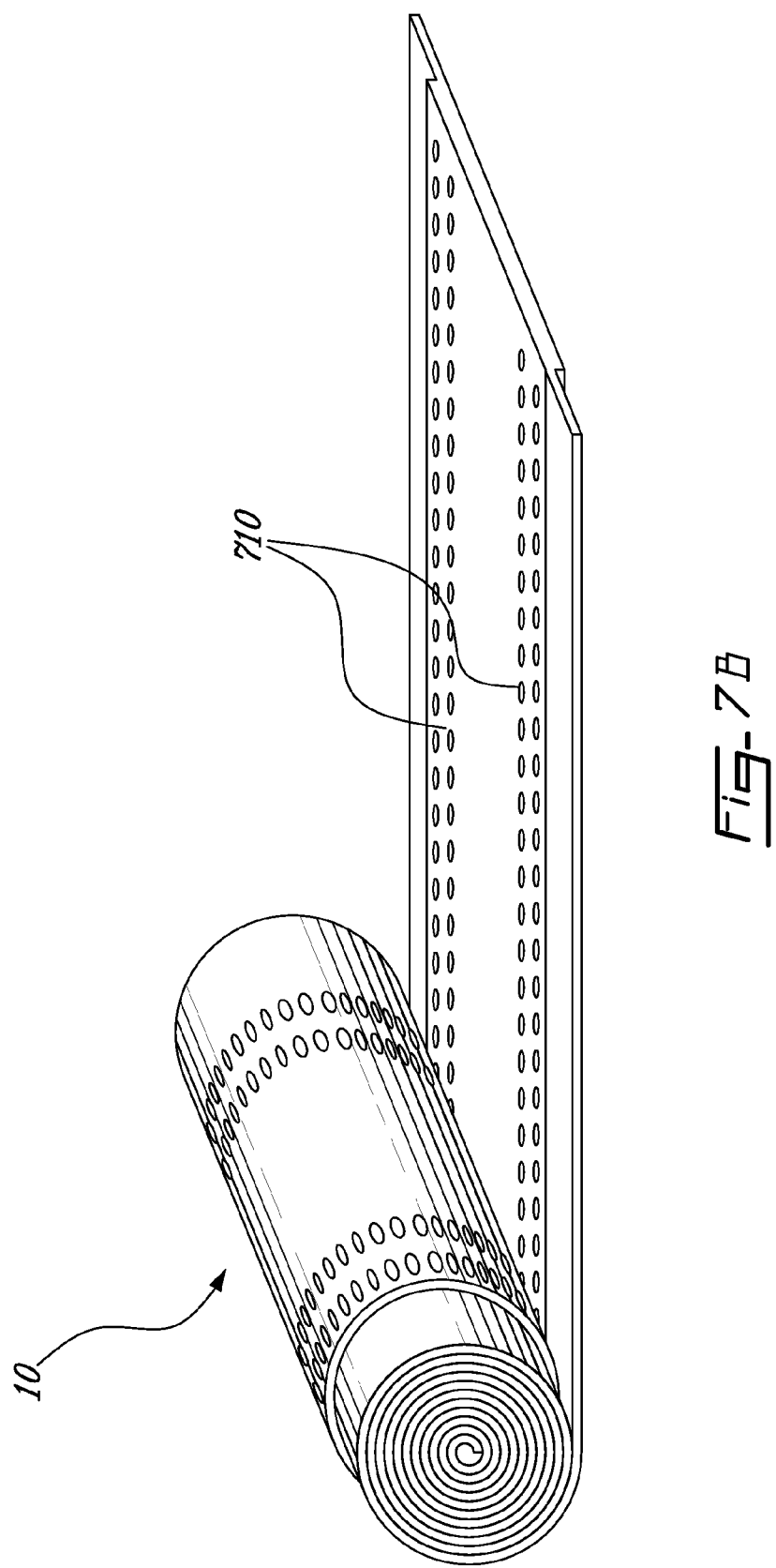

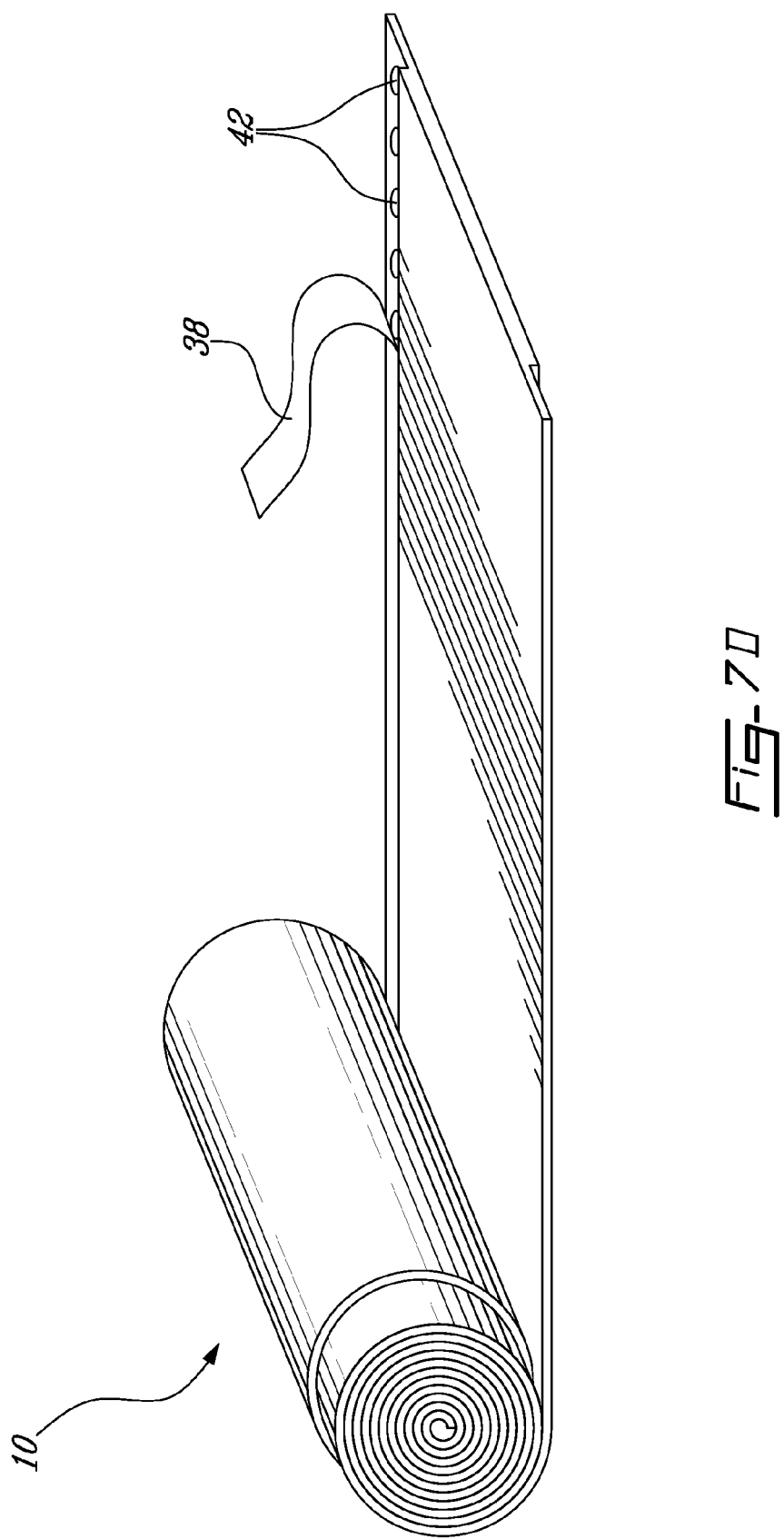

MOISTURE BARRIER UNDERLAYMENT WITH INTERMEDIATE LAYER TO ACCOMMODATE EXPANSION AND CONTRACTION

CROSS-REFERENCE TO RELATED APPLICATIONS

This application is a National Entry Application of PCT application No. PCT/CA2005/000521 filed on Apr 6, 2005 and published in English under PCT Article 21(2), which itself claims priority on U.S. provisional application No. 60/560,332, filed on Apr 6, 2004. All documents above are incorporated herein in their entirety by reference.

BACKGROUND OF THE INVENTION

1. Field of the Invention

This invention relates generally to membranes suited for use as water/moisture barrier or sound insulation in roofing, flooring and other related applications.

2. Description of the Prior Art

The prior art reveals the use of moisture barriers chiefly aimed at the roofing trade. A fundamental limitation in the way moisture barriers are installed requires a bump producing overlap of the joints. This limitation is a major drawback in the use of such membranes in the flooring trade. Indeed, a floor surface cannot tolerate the presence of a bump underneath a floor surface since that bump transfers to the floor surface. Even for roofs the presence of bumps can become a problem since it is often required for workers to walk on roof surfaces such as when maintaining air conditioning units or other such pieces of equipment found on roofs. Walking across bumps or dragging and carrying equipment across bumps can damage the overlap and which can result in a leak.

The membrane currently used for roofing and which has already excellent properties which makes it a perfect choice for a variety of applications going beyond its original purpose. Currently such membrane consists of at least one layer of bitumen or related substance offering hydrophobic properties and coated on one or two faces by one or several films (or other materials) and is reinforced or not either at its core or surface.

In the wooden flooring trade, there is no use of such impermeable membranes which are true moisture barriers, rather, moisture retardant membranes are used to help reduce problems related to expansion and contraction of floors using wood as its main component although moisture can also affect other types of flooring material such as ceramic tiles, carpet, vinyl, marble and others. The moisture barrier membrane arrangements currently used underneath ceramic tiles present some bumps (i.e. an uneven top surface) which result in mechanical weaknesses. On the other hand, moisture retarding underlayments are, like the term implies, means for slowing down variations in moisture level. That is useful for short term fluctuations in moisture levels but in areas where moisture such as from an unheated basement is present at a high level for weeks or even months, this can cause serious warping on a wooden floor since, over time, moisture will pass through the moisture retarder and infiltrate the wood fibers.

Another way by which moisture can infiltrate from underneath is when moisture is released by the concrete, such as in a basement, which raises the level of moisture.

Moisture coming from underneath is very difficult to control and thus far, the only practical solution appears to be moisture retarder which have the problem of having moisture leaks occurring at the joints between strips of the membrane that are not sealed but merely overlapped. To overcome this, some membranes use taped joints but the tape can, over time, deteriorate and become useless, thus exposing opened joints.

Sound insulation membranes also suffer from sounds infiltration between adjacent membranes or layers of insulation material. The sound insulation membranes are typically abutted one against the other, thereby giving rise to the formation of a straight-through seam through which the sound can pass. Sound insulation sheet-like members are typically not overlap at the junction thereof to prevent the formation of bumps.

SUMMARY OF THE INVENTION

It is therefore a main object of this invention to provide for a new sound insulation and/or moisture insulation membrane arrangement which addresses the above mentioned concerns.

It is another aim of the present invention to provide a new moisture barrier membrane to help equalize moisture levels between the top and bottom layers of a floor surface.

It is another object of this invention to provide for a flexible insulation membrane arrangement having an overlap joint presenting no bump.

Therefore in accordance with a general aspect of the present invention, there is provided a flexible insulation membrane having a new profile so that overlapping areas between adjacent membranes do not increase the thickness of the membranes at the overlap, thereby providing for the formation "no-bump joints". A number of variations are herein disclosed explaining various overlapping joints solutions.

In accordance with a further general aspect of the present invention, there is provided a flexible insulation sheet-like material arrangement comprising at least first and second flexible insulation sheets installed in a coplanar relationship, said first and second insulation sheets having a thickness W1, and an overlap joint between said first and second insulation sheets, said overlap joint having a thickness W2 substantially equal to or less than the thickness W1 of said first and second sheets.

In accordance with a further general aspect of the present invention, there is provided a flexible insulation membrane comprising a strip of insulation material adapted to be unrolled on a support surface, the strip of insulation material having longitudinal side edges of reduced thicknesses adapted to cooperate with adjoining longitudinal side edges of similar flexible membranes in forming free-bump overlap joints at the junction of adjacent insulation membranes.

In accordance with a further general aspect of the present invention, there is provided a moisture barrier underlayment adapted to be installed on a subfloor to provide a substantially flat and level surface for receiving floor covering, comprising at least first and second strips of moisture barrier membranes laid down one next to the other in a coplanar relationship, said first and second strips having a thickness W1, and an overlap joint between said first and second strips, said overlap joint having a thickness W2 substantially equal to or less than W1 and providing a free-bump transition between said first and second strips while preventing straight-through moisture infiltration from the subfloor to the floor covering.

In accordance with a still further general aspect of the present invention, there is provided a floor arrangement adapted to be installed over a subfloor, comprising flexible flooring members adapted to be laid one next to the other in a coplanar relationship over the subfloor, said flexible flooring members having a thickness W1, and an overlap joint between each pair of adjacent flexible flooring members, said overlap joint having a thickness W2 substantially equal to or less than W1 and providing a free-bump transition between said flexible flooring members.

In accordance with a still further general aspect of the present invention, there is provided a baseboard moisture barrier backing adapted to be installed at the junction of a wall and a floor of a room to cooperate with a moisture barrier underlayment, comprising a thin sheet-like impermeable body having a wall panel and a floor panel extending from said wall panel, said floor panel being adapted to be placed in sealingly overlapping relationship with the moisture barrier underlayment.

In accordance with a still further general aspect of the present invention, there is provided a moisture barrier protrusion capping member adapted to be installed about a protrusion extending from a floor to cooperate with a moisture barrier underlayment laid on the floor, said moisture barrier protrusion capping member having a thin sheet-like impermeable body adapted to be fitted over the protrusion, said thin sheet-like impermeable body having a wall portion and a floor portion extending from said wall portion, said wall portion being adapted to extend over the protrusion while the floor portion offers and upwardly facing surface to be placed in sealingly overlapping relationship with the moisture barrier underlayment.

The term "insulation membrane" is herein intended to designate any flexible sheet-like material that could be used to provide insulation against at least on of the following elements: moisture, water, sound and impact sound.

The term moisture barrier is also intended to cover waterproof and impermeable materials.

BRIEF DESCRIPTION OF THE DRAWINGS

Reference will now be made to the accompanying drawings, showing by way of illustration a preferred embodiment of the present invention and in which:

FIGS. 1a and 1b are perspective views of a flexible moisture barrier membrane laid down on a subfloor and illustrating various possible membrane profiles and associated joint variations thereof in accordance with a preferred embodiment of the present invention;

FIG. 1d is a perspective view of an intermediate floor panel showing the smoothly rounded or beveled bottom edges thereof to prevent puncturing the underlying moisture barrier membrane against which the intermediate floor panel is installed;

FIGS. 1e, 1f, 1g, 1h and 1i illustrate various possible edge detail profiles of the intermediate floor panels in accordance with a preferred embodiment of the present invention;

FIGS. 2a, 2b, 2c, and 2d are perspective views of some of the possible joint variations of the flexible moisture barrier membrane shown in FIGS. 1a and 1b;

FIGS. 3a, 3b and 3c are perspective views of a peel and stick layer on joint; of an overlap with a least one sticky surface; of a membrane having a coating, such as granular coating;

FIG. 4a is a perspective view of various corner and side modules used in association with the membrane to seal a room in accordance with a preferred embodiment of the present invention;

FIGS. 4b, 4c and 4d are perspective views illustrating various sealing details of the corners and sides of a building room;

FIGS. 7b, 7c and 7d are further perspective views of rolls of flexible moisture barrier membrane having different pattern of peelable covering film and printed indicia thereon;

FIG. 8b is a top plan view of the floor covering member shown in FIG. 8a.

DESCRIPTION OF THE PREFERRED EMBODIMENTS

Figure 1B:
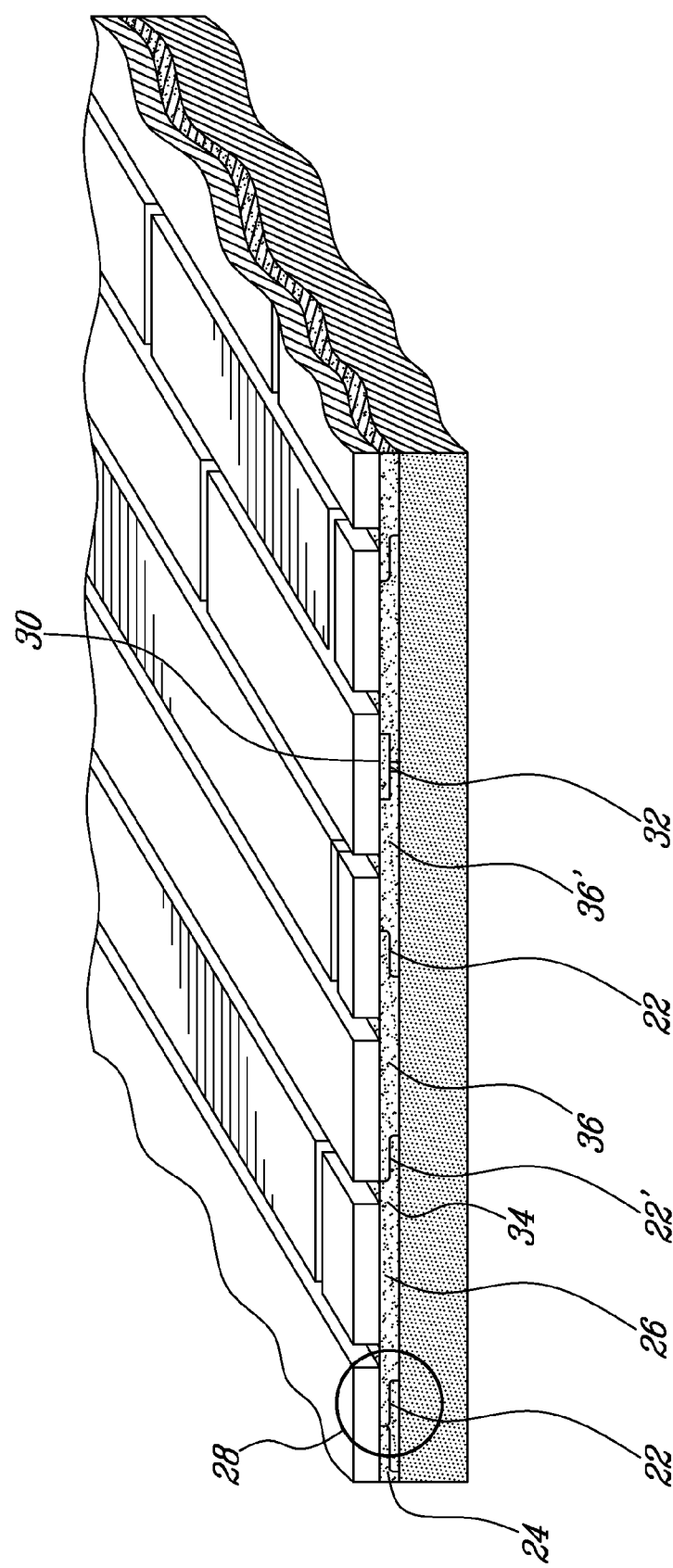

FIG. 1a illustrates a floor assembly wherein rolls of flexible moisture barrier membrane are laid down on a subfloor (12) and then covered with a layer of intermediate floor panels (44) on which floor boards (40) (in the illustrated example wood planks) are installed. In the case of FIG. 1a, the subfloor (12) is concrete but it could be any type of material commonly used as subfloor material such as plywood, and is either the subfloor of a basement or the subfloor (12) of a multi storey concrete structure building. In both cases, concrete is known for holding moisture over a long period of time and the problem is compounded when a slab of concrete is laid directly over a soil (14) that has high water content.

Since moisture content (MC) coming from underneath and through the subfloor (12) can be, at times, much higher than the MC in the ambient air (16) above the subfloor (12), that is the ambient air (16) in a given room, it is wise to block the ingress of moisture from underneath with the use of an efficient moisture barrier. As explained earlier, current membranes used in the flooring industry are merely moisture retarders and are therefore of limited efficiency. The bituminous based material used in roofing membranes is highly hydrophobic. FIG. 1c shows roof membranes (18), as used today. It has the inconvenience of having an overlap joint (20) which creates a surface bump. Although that is generally acceptable in a roofing environment, when it comes to laying down a floor, any irregularities of the subfloor can be transferred to the floor, which is of course undesirable.

Figure 1C:
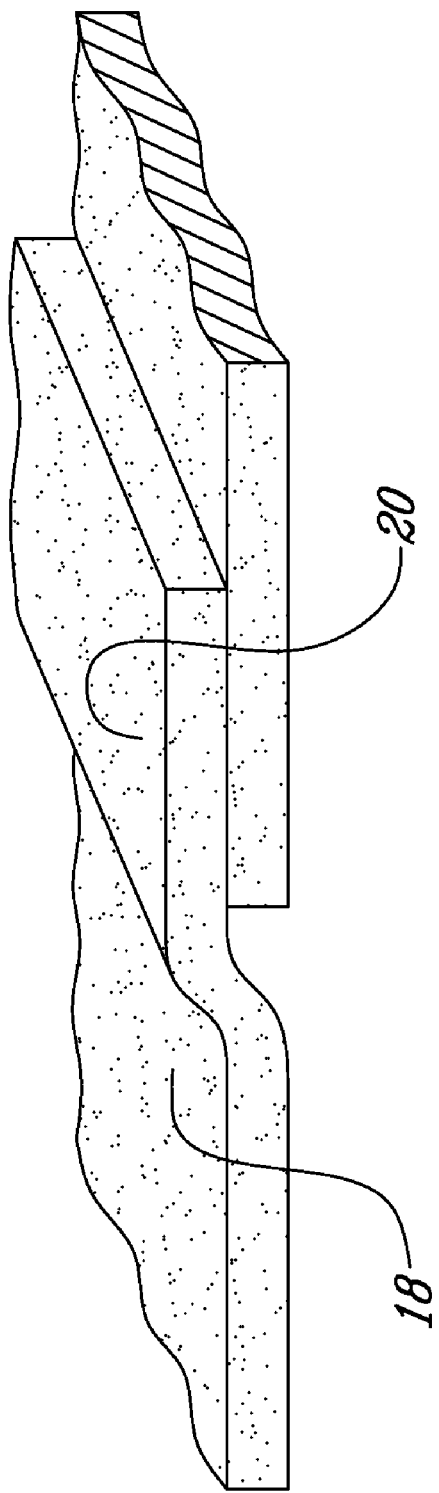
FIG. 1c is a perspective view of a Prior Art overlap joint between two adjacent roofing membranes.

To overcome this limitation, a major modification is proposed to the standard roof membrane (18) which makes it usable as a floor membrane (10) as seen in FIGS. 1a and 1b where the end and side edge portions (22) of the membrane (10) are thinner than the rest of the membrane so that when a second strip (26) of membrane is laid down next to a first strip (24), the overlap (28) is of equal thickness with the rest of the membrane (10), as opposed to the overlap joint of the prior art as seen in FIG. 1c. In some applications, the combined thicknesses of the overlapping portions of adjacent membranes (10) can be less than the thickness of the membranes (10), thereby providing for the formation of a cavity or depression (see FIG. 1d). One of the many properties of the original roof membrane (18) which is also found in this floor membrane (10) is that when a certain pressure is applied to the overlap (28), such as when passing a roller, the two separate strips (24, 26) become fused to the point of becoming indistinguishable from each other so as to create a single monolithic structure rather than an aggregate combination of joined strip.

This of course insures a perfect moisture-proof seal. Additional sealing or adhesive material can be provided at the interface of the overlapping portions of the membranes (10) to improve the overall sealing properties of the assembly. The floor membrane (10) is preferably raised along the base of the walls of the room to block any moisture that could rise due to capillary action or through a sudden rise in the water table in the case of a basement installation.

Besides being overlapped, the edges (22) can also be abutted and the cavity defined thereby filled with a liquid membrane or any other insulation material (30) in order to create an overlap sealing joint (32) (FIG. 1b). The insulation material 30 is preferably of the same type as the membranes (10).

Figure 2A:
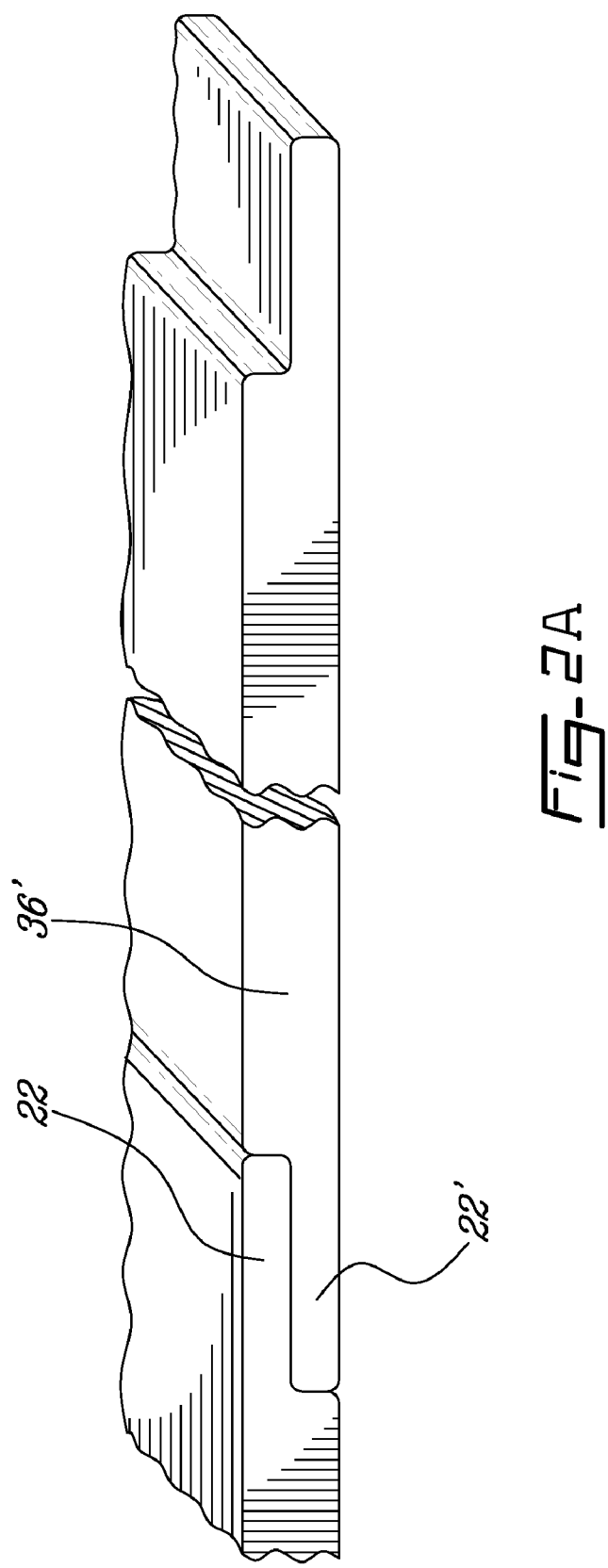
Figure 28:
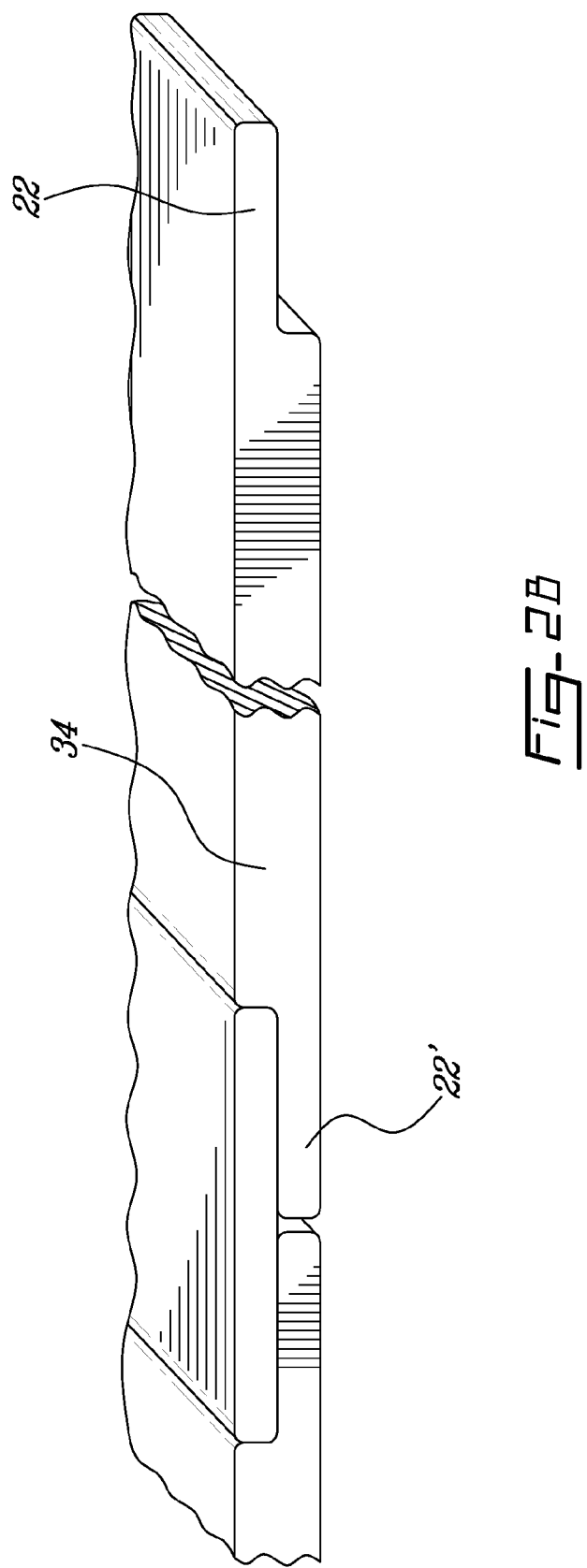

As shown in FIGS. 1b and 2a,b,c and d, a number of membrane profiles can be created, the up-down profile (34) (or Z-shaped profile) where one edge (22) is up while the other edge (22') is down or the up-up profile (36) (also herein referred to as the inverted hat-shaped profile) followed by a down-down profile (36') (also herein referred to as the hat-shaped profile), which is nothing more than a reverse up-up profile (36). Besides the variations above, other options include a down-down profile (36') which creates a groove (60) from where moisture or water can migrate and are eliminated through normal evaporation or drain (see FIG. 2d).

Figure 3C:
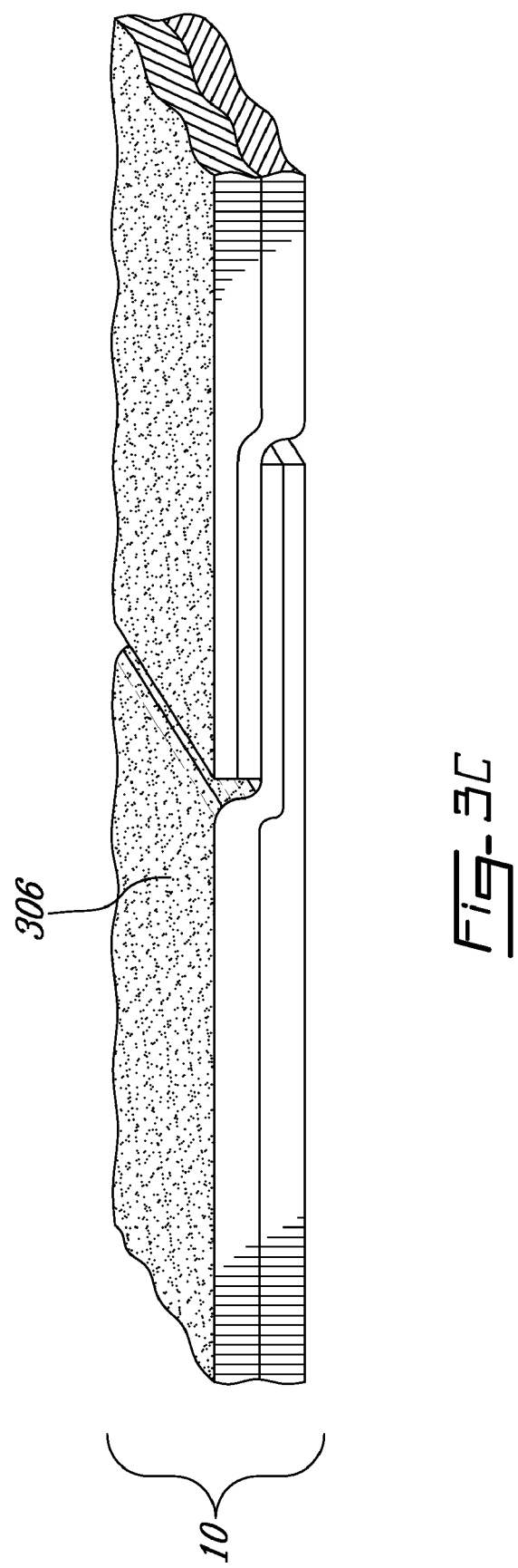

The top and bottom sides of the membrane (10) can be fully or partly covered with a film (38) (only the top face shown in FIG. 3a). The film (38) can be removable or not. However, the film (38) is preferably a peel-off film. The film (38) can be peeled-off to expose and adhesive or sticky surface of the membrane (10). The membrane (10) can be adhered to the subfloor (12) over the entire area thereof or only at discrete exposed sticky points to facilitate removal of the membrane (10) from the subfloor (12) when so desired. When the membrane (10) is adhesively secured to the subfloor (12) over the entire area thereof, there is no room for water infiltration or sudation between the membrane (10) and the subfloor (12). It also advantageous to adhesively attach the membrane 10 to the subfloor in that it provides for additional impact sound attenuation. However, it is understood that the membrane (10) could be otherwise secured to the subfloor (12) or be simply freely laid down thereon with no adhesive or other fastening means. Likewise, floor boards (40) can be adhered or not to the membrane (10) depending upon whether the film (38) is removed or not. To control the amount of adhesion desired, the film (38) can have various patterns of perforations (42) so that only discrete points of adhesion be exposed upon removal of the film (38), as shown in FIG. 7c. Also, as shown in FIG. 7d, the adhesive surface of the membrane (10) and the associated protective film (38) could be limited to the longitudinal side adjoining portions thereof, thereby allowing removing the film (38) while walking on the remaining portion of the membrane (10).

The film (38) could be in silicone or in any other suitable plastic or thermoplastic covering materials, such as polypropylene. The membrane (10) could also be covered with wax. A layer of sound insulation foam or other flexible sound insulation material could also be laminated onto the membrane (10) to benefit from added sound insulation in addition to the moisture and water sealing properties of the membrane. Alternatively, foam open cell and foam closed cell materials could, for instance, be floatingly or adhesively laid over the membranes (10) after the same have been installed on the subfloor (12). Reinforcing fibers can be provided in the bituminous core of the membrane (10). Alternatively, a reinforcing layer can be provided at the top and/or bottom surface of the membrane (10).

As shown in FIG. 3a, the film (38) can only cover a sticky adjoining edge portion (20) of the membrane (10). The joint is made thinner by applying pressure during the manufacturing process so that the core layer (300) of the membrane (10) is also compressed and so is the coating or coatings (302) which are applied during manufacturing. The core layer (300) and coating (302) do not have to share 50/50 of the thickness depending upon the manufacturing process used, the ratio can vary as well as the number of layers, some membranes (10) have a top silicon layer (304) as per FIG. 3b while others have aggregates (306) as per FIG. 3ac. Various types of top finish materials, such as steel, plastic, thermoplastic, could be used in place of aggregate (306). A nonskid or an anti-friction finish could be given to the top coat of the membrane (10) depending on the intended application. It could also be treated to be puncture-resistant.

Besides its moisture repellent properties, the membrane (10) also has inherent soundproofing characteristics, great resistance to any mishaps such as dropped tools and other such incidents common in a construction environment which would normally puncture the less resistant polyethylene membranes used today. Also, after the floor boards (40) are laid, any dropped object will be less likely to break since there will be a cushioning effect from the membrane (10). For example, in a gym environment, a falling player will likely be less hurt since the floor will absorb part of the impact. In any case, sound transmission is greatly reduced by the soundproofing characteristics of the membrane (10). Of course if more sound proofing is desired any other type of membrane or soundproofing system can be installed on top of the membrane (10) as mentioned hereinabove.

Unlike liquid membrane, the membranes (10) permit to immediately proceed with the installation of the floor covering after the membranes have been unrolled in position over the subfloor (12). This represents important time and cost savings.

Usually floor boards (40) are nailed or stapled and when the nails (46) or the staples (48) pass through the membrane and into a wood subfloor (as opposed to concrete), the viscous properties of the membrane material make each puncture self-sealing so that the moisture properties of the membrane (10) are not affected. It is pointed out that the floor covering boards (40) can also be floatingly installed or glued to the membranes (10). Irrespective of how the floor covering is installed on the membrane (10), the membrane advantageously permits for the expansion and contraction of the material installed over and under the membrane (10).

The membrane (10) could also be used as a double security wall for pool, thank and other fluid containers. It can also be installed in basement walls (inside-outside), partition walls, roofs, ceilings, sidewalks, drive ways, patios and any other types of floors.

Figure 5:
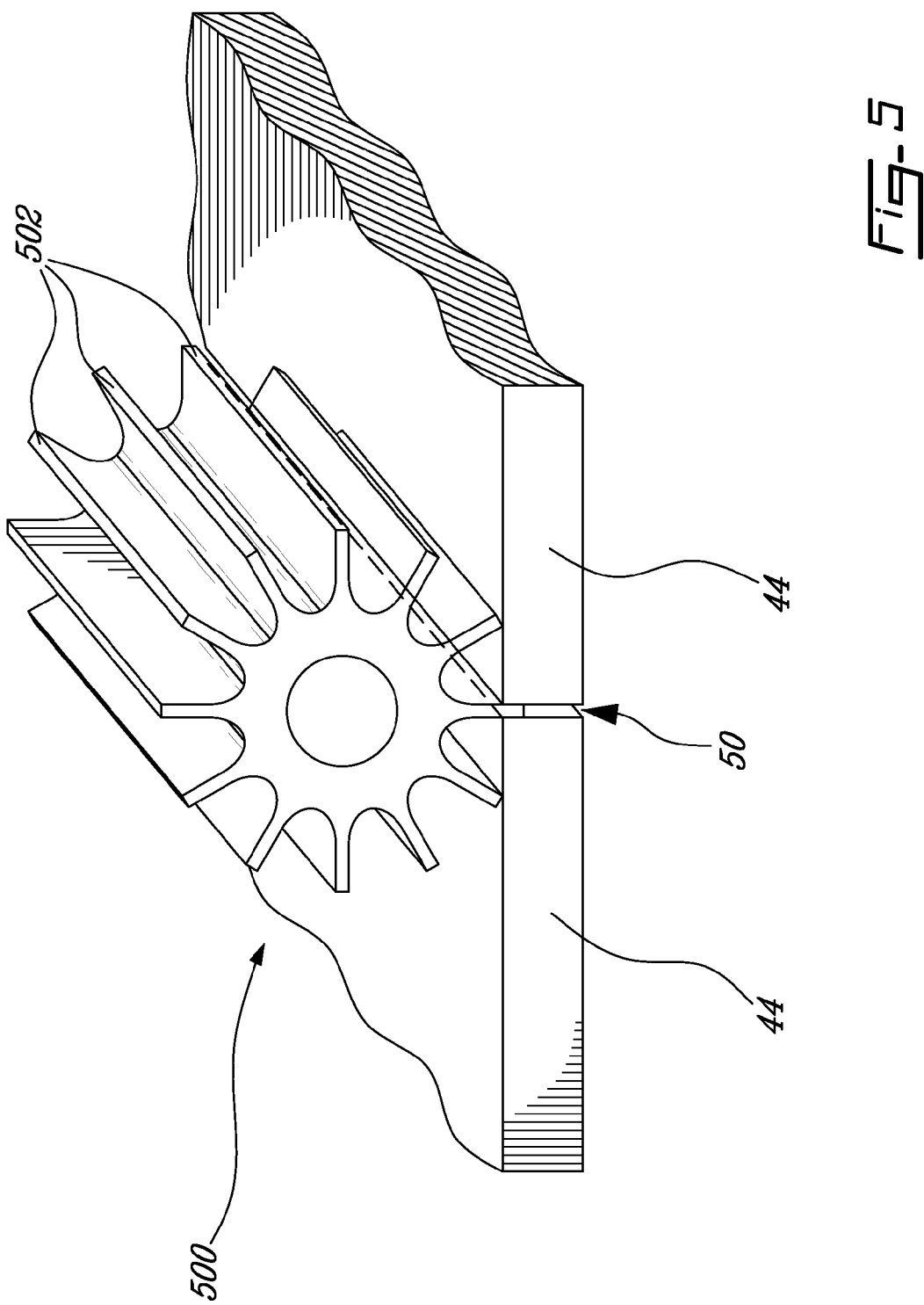
FIG. 5 a perspective view of a spacer tool that can be used during the installation of the intermediate floor panels shown in FIGS. 4a to 4d.

When it is desired to nail the floor boards (40), a layer of substantially rigid intermediate panel (44) is preferably set between the membrane (10) and the floor boards (40) for receiving the nails (46) or other mechanical fasteners, such as staples (48). The intermediate panels (44) are also used when the finish floor covering need to be installed on a rigid surface. The intermediate panels (44) advantageously substantially eliminate the torsion and shear stress on the membranes (10) resulting from the expansion and contraction of the material over and under the membranes (10). The panels (44) can be made of plywood, plastic, agglomerated wood fibers, steel and other substantially rigid material. The panels (44) are narrow—about, but not limited to 2 to 16 inches in width so that preferably only one nail (46) or staple (48) is put into each panel (44) for example, if the manufacturer of the wood floor recommends nailing or stapling at every 9 inches, a 9 inch panel (44) is preferably selected if it is 5 inches, a 5 inch panel (44) is selected. By having only one nail (46) or staple (48), the panel (44) is free to expand and contract within the expansion gap (50) set between each panel (44) which reduces stress on the floor boards (40). The expansion gap (50) is selected according to factors such as the type of material the panel (44) is made of and a typical moisture content and fluctuation for the geographical area the panel (44) is to be installed and is measured using a spacer tool (500) (see FIG. 5) having a plurality of radially expanding strips (502) of various thicknesses indicated by indicia (not shown) and color coded on each strip (502) to select the proper spacing (50) between each panel (44). The panels (44) are staggered during installation (FIG. 1a) so that the floor boards (40) do not hit all a series of aligned inter-panel gaps (50) along a length of floor, and the panels (44) are preferably installed transversally with respect to the floorboards (40). The inter-panel gap (50) can be filled with contractible/expandable filler.

Each panel (44) has softened, rounded or beveled bottom edges (FIG. 1d) to reduce potential damage to the membrane (10) during the installation process of the panels (44) or during the repeated expansion and contraction movements of the panels (44) over the years. The top corners of each panel (44) could be cut at right angles or rounded as the bottom corners depending on the material to be installed over the panel (44).

Figure 1E:
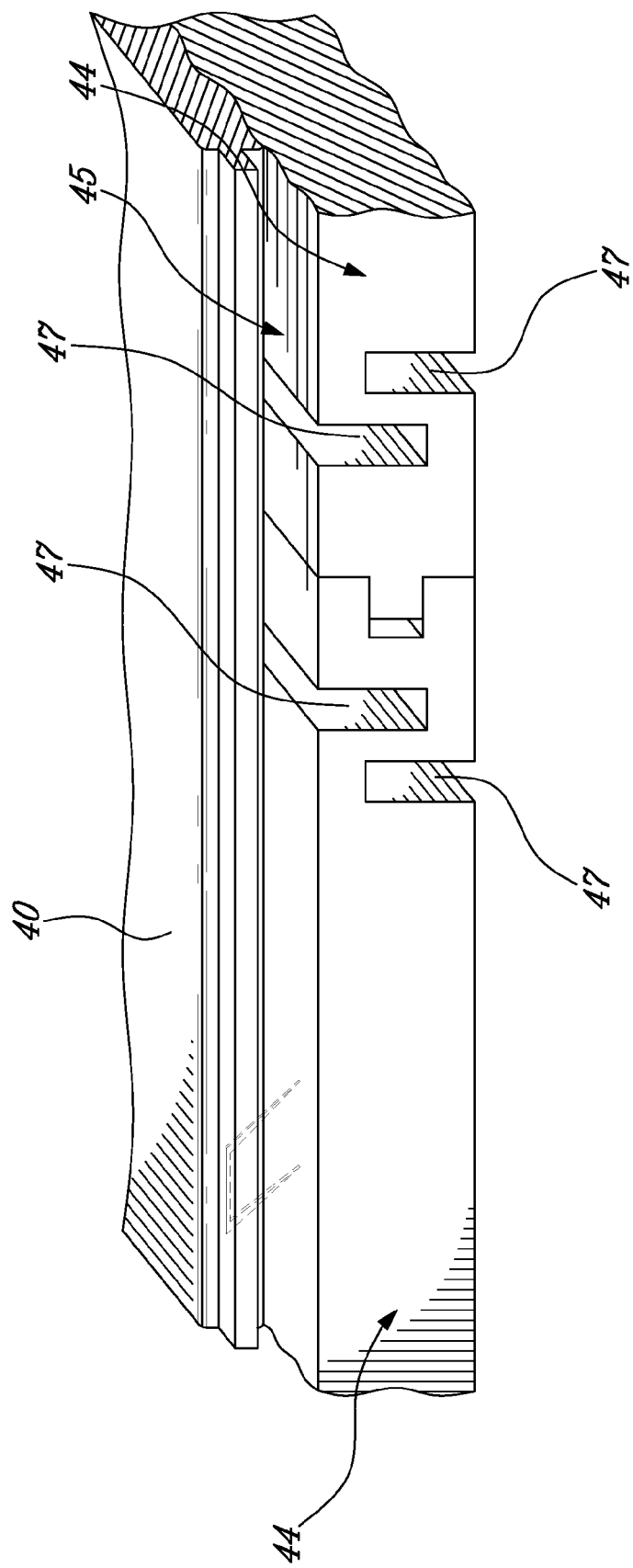

The panels (44) can be profiled in conventional "tongue and groove" fashion to provide inter-panels locking engagement as shown in FIGS. 1e and 1f. Alternatively, the panels (44) can have a "groove and groove" profile and a spline (not shown) can be used to bridge the panels (44) together, as well know in the art of wooden floor planks. Alternatively, the panels (44) could be profiled as the floor covering panels described in Applicant's U.S. provisional application No. 60/560,184 filed on Apr. 06, 2004, the contents of which is herein incorporated by reference. As shown in FIGS. 1e and 1f, each panel (44) is preferably provided with a bellows formation (45) as an intra-panel expansion/contraction accommodation means. The bellows formation (45) provides springiness to each panel (44) allowing the same to accommodate the expansion and contraction movements of the floor planks (40) secured thereto. Each bellows formation (45) is formed by opposite adjacent grooves (47) sequentially defined in the top and bottom surface of the panels along the length thereof.

As shown in FIGS. 1g, 1h and 1i, inter-panel expansion/contraction accommodation means can be provided between adjacent panels (44) by abutting a longitudinally extending flexible finger-like formation (49) of a first panel (44) against a similar flexible finger formation (49) of a second adjacent panel (44). The flexible finger formations can be obtained by defining slightly inboard longitudinal grooves (51) along the sides of the panels (44). As shown in FIGS. 1g, 1h and 1i, the grooves can have various inclinations and cross-sectional profiles (rectangular FIG. 1g, triangular FIG. 1h and trapezoidal FIG. 1i). The finger formations (49) can provide for the formation of inter-panel gaps (FIGS. 1h and 1i) or not (FIG. 1g). The so formed inter-panel expansion/contraction accommodation means is designed to accept more than the anticipated expansion of the covering plank (40). The inter-panel expansion/contraction means is not limited to the above-described embodiment and also encompass any spring means engagement between adjacent panels.

As shown in FIG. 4a, when laying the membrane (10) and reaching corners, folding of the membrane (10) can provide adequate sealing for inside corners, but for outside corners and around doorways, passageway, columns, pipe or others, special corner modules having hydrophobic properties are used to provide adequate sealing properties. The corner modules are identified as: inside corners (400); outside corners (402); passageway corners (404); as well as a linear trim (406) which is used when it is otherwise impractical to raise the membrane up the wall as per FIG. 1. Each module (400), (402), (404) and (406) can be provided as a moisture barrier baseboard backing having a body made of a thin sheet-like material adapted to be position against the room wall before the installation of the baseboards.

The sealing modules (400), (402), (404) and (406) can be preformed or formed directly at the job site. The sealing modules (400), (402), (404) and (406) are preferably made from a simple or multi-ply impermeable film which can sealingly adhere to the bituminous membrane (10) and which can be heat sealed. For instance, a polyethylene film could be used. Various manufacturing methods can be used to shape the film material into the desired configuration. For instance, the modules can be heat sealed or even folded into shape by a compression press. Dye cast and molding techniques, such as vacuum molding and injection molding, could also be used to form the modules (400), (402), (404) and (406). It is important that the walls of the modules be as thin as possible. A polyethylene film having a 6 mm thickness has been successfully tested.

Figure 4C:
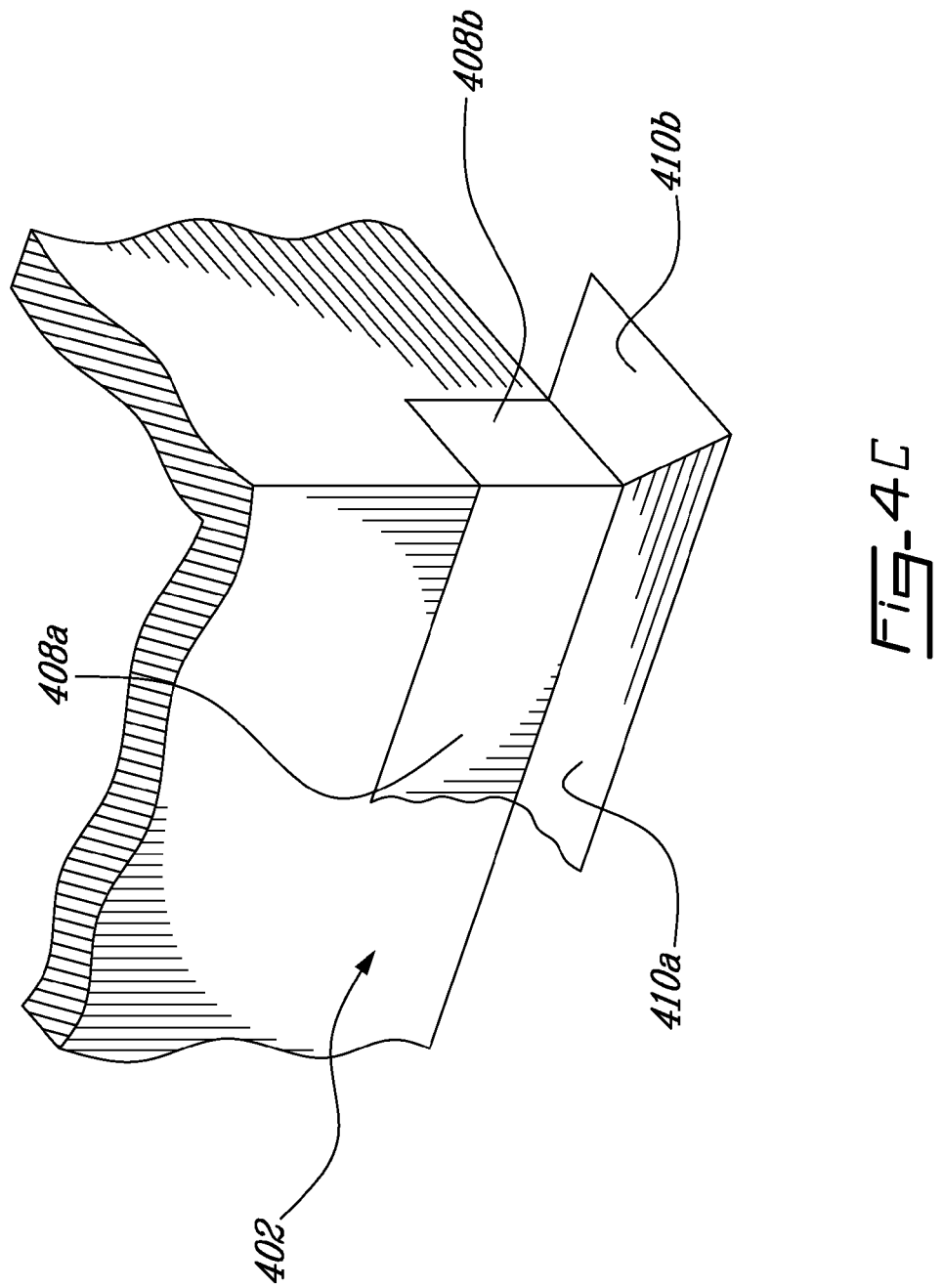

As shown in FIGS. 4b and 4c, each module has a wall panel (408) and a floor panel (410) extending at right angles from the bottom of the wall panel (408), the wall and floor panels each having sections (408a), (408b), (408c), (410a), (410b), (410c) extending at right angles for completely capping the corner to be sealed. The wall panel (408) can extend at any desired height over the wall of the room to be sealed. The floor panel 410 projects sufficiently away from the wall to provide a sealing overlap with the membrane (10). The membrane (10) is laid over the floor panel (410) of the corner modules (400), (402), (404) and (406) and sealed thereto. The wall panel (408) can be secured to the wall of the room or not. The linear trim (406) can be heat sealed to the corner modules (400), (402) and (404) on site by the installer. The installer has just to cut a desired length of film to form the linear trim and then heat sealed it to corner modules.

As shown in FIG. 4d, for new building constructions, it is possible to completely seal the building room by room by folding a moisture barrier membrane (10') similar to moisture barrier membrane (10) over the bottom end of the skeleton structure of the building wall before the installation of the gypsum boards. Strips of peel-off covering film 38 can be provided to expose adhesive surface of the membrane (10) to facilitate mounting thereof over the studs.

Sideways infiltration of water or moisture through the various layers forming the floor assembly can be prevented by leaving a peripheral gap between the floor assembly, including the moisture barrier underlayment, and the walls bounding a room and by subsequently filling said peripheral gap with a sealer, such as a liquid membrane. Alternatively, a sealing tape can be installed all around the perimeter of the floor assembly to prevent sideways infiltrations. In this way the ends and the sides of the floor planks (40) and intermediate panels (44) at the periphery of the room can be readily sealed after the installation of the floor covering.

Figure 6:
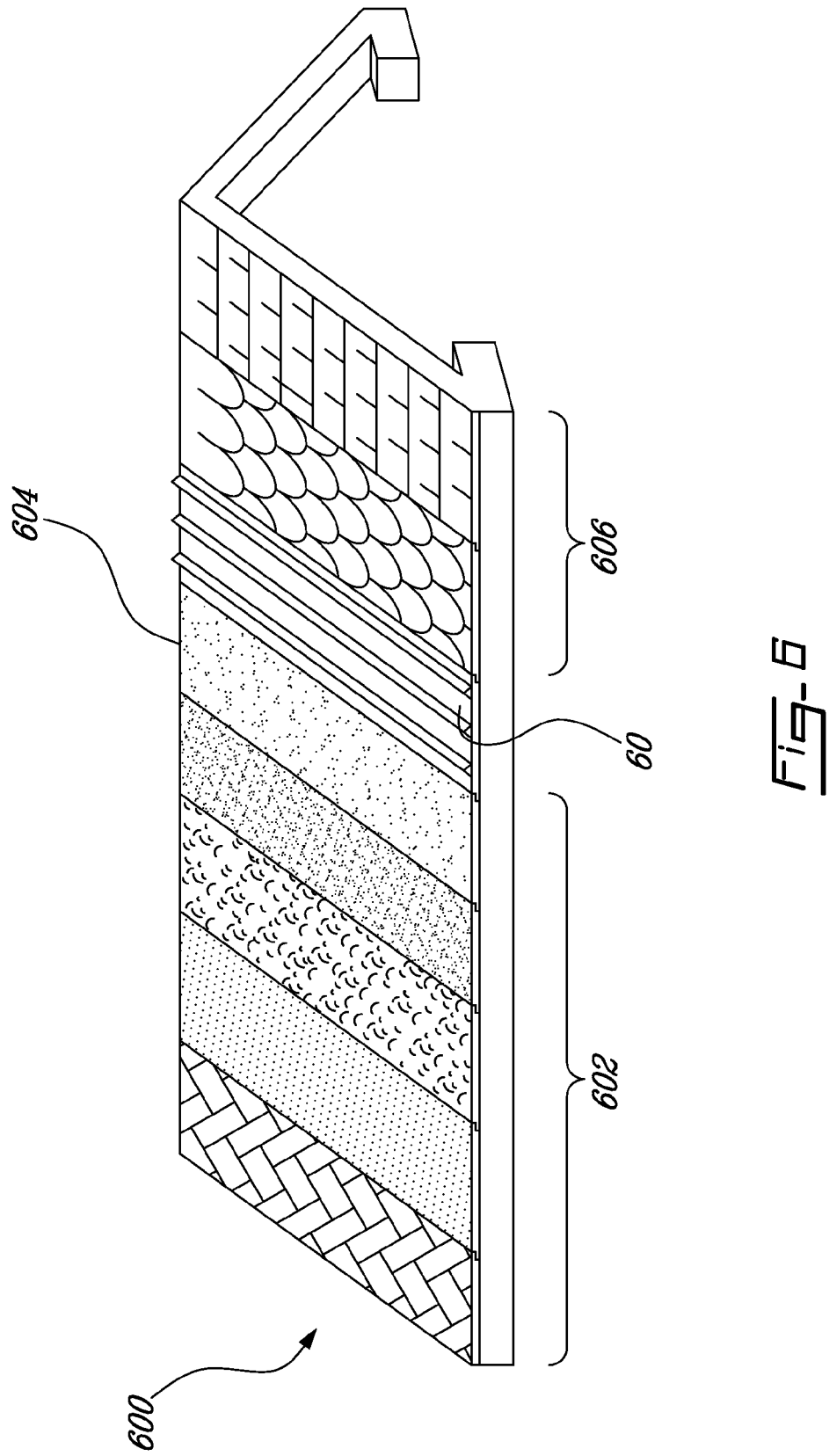
FIG. 6 is a perspective view of a gable roof showing variations of the moisture barrier membrane, including surface top coating.

As shown in FIG. 6, when used on a gable roof (600), the membrane (10) can be laid horizontally as is customary in the trade or it can be laid vertically as per this illustration wherein various types or overlaps (602) as described earlier are showcased and also can include surface top coatings which makes the membrane the only roof covering necessary; followed by the overlap of FIG. 2d which creates a groove (60) from where moisture or water can evacuate down the slope. The membrane (10) goes over the apex of the roof (604) and down to the other side so that there are no seams at the apex. (604). Typical shingles (606) can then be laid. For flat roofs, an installation similar to a floor installation is made with no bumps. Multiple layers of membranes (10) can be laid one on top of the other without creating any bumps or seams.

Figure 7A:
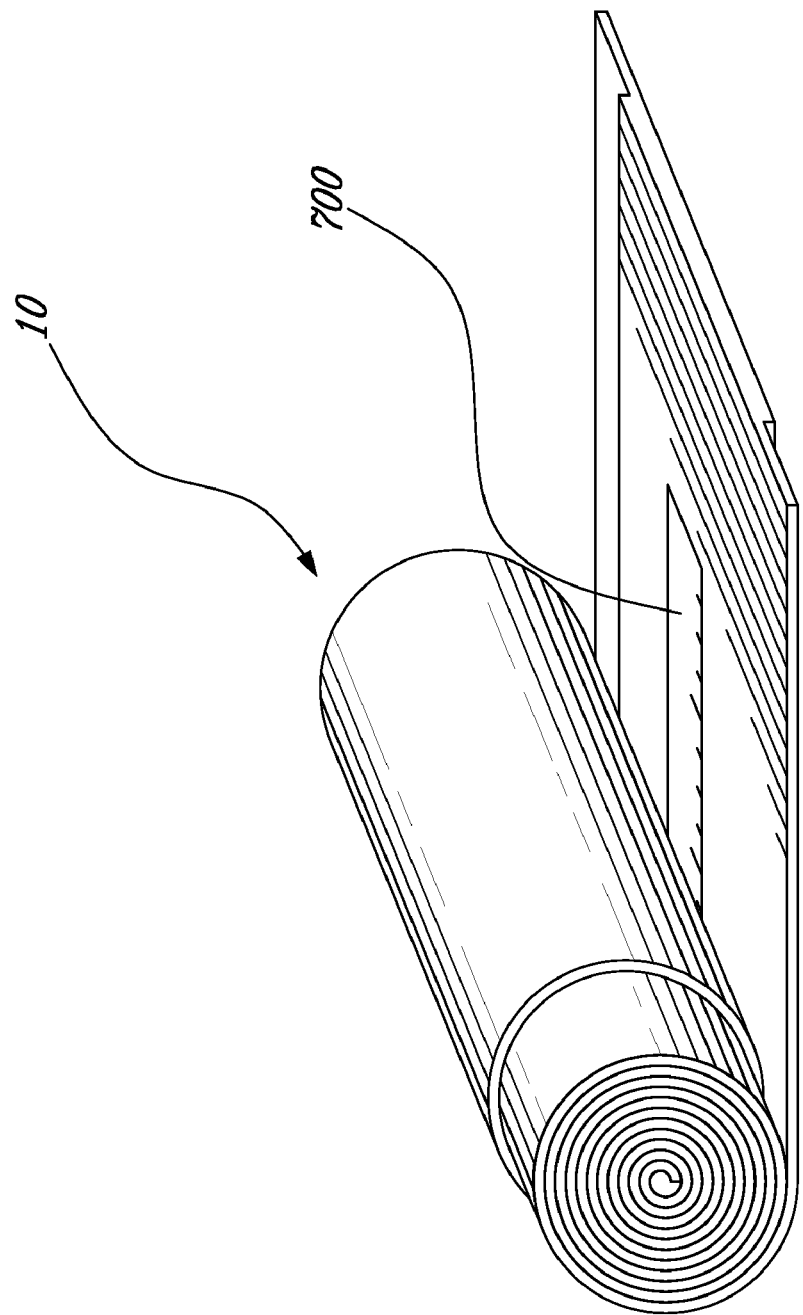
FIG. 7a is a perspective view of a roll of membrane with the end of a roll ruler provided thereon.
Figure 7C:
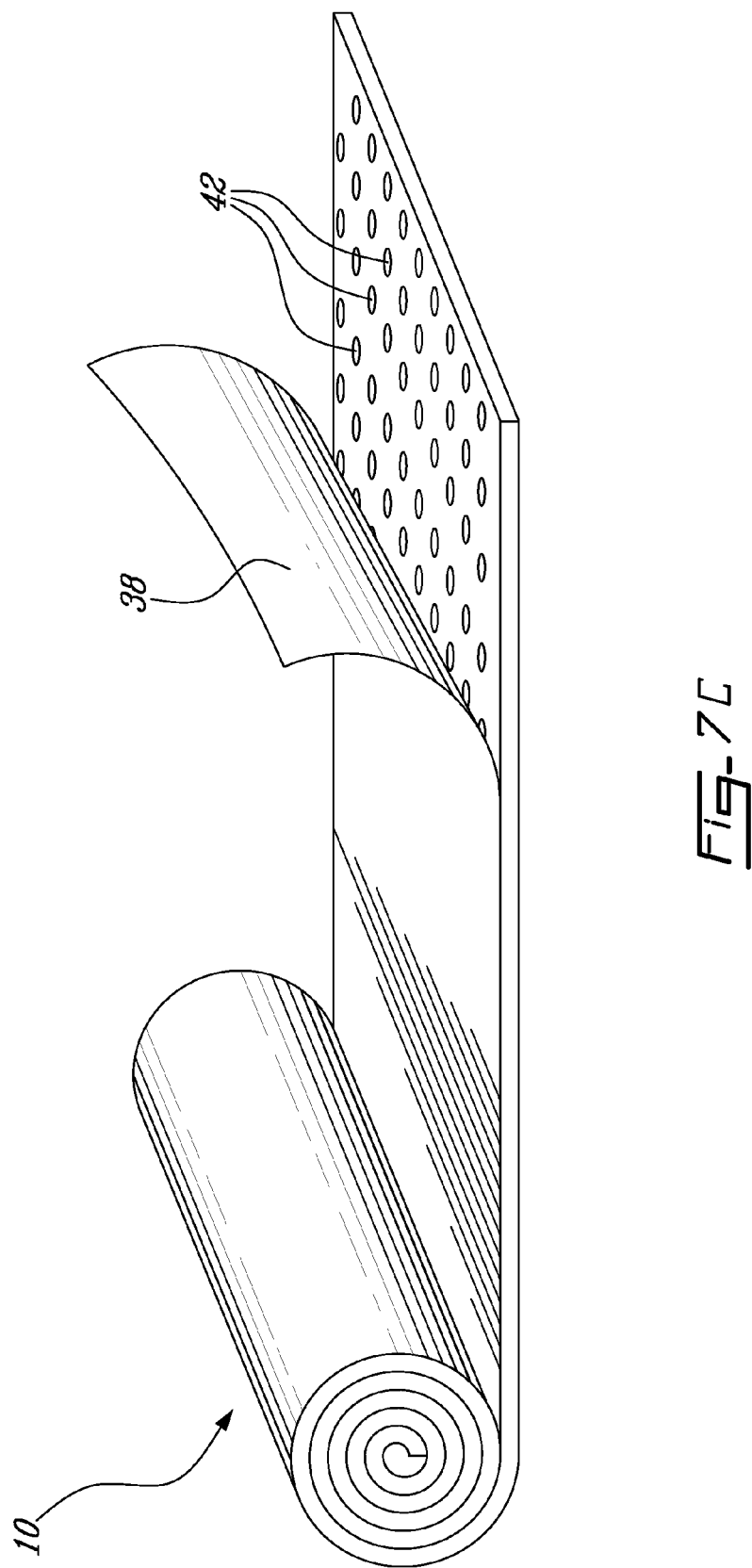

As shown in FIG. 7a, a roll of membrane (10) can have as a feature an end of roll ruler (700) which clearly indicates the length of roll left so that a tradesman can better evaluate what to do with the rest of the membrane (10). Also, as shown in FIG. 7b, various indicia (710) can be printed on the top and bottom surface of the membrane to assist the installer during the installation of the membrane (10). For instance, the Metric and the equivalent English Measuring Scale could be printed on the membrane (10).

Figure 8A:
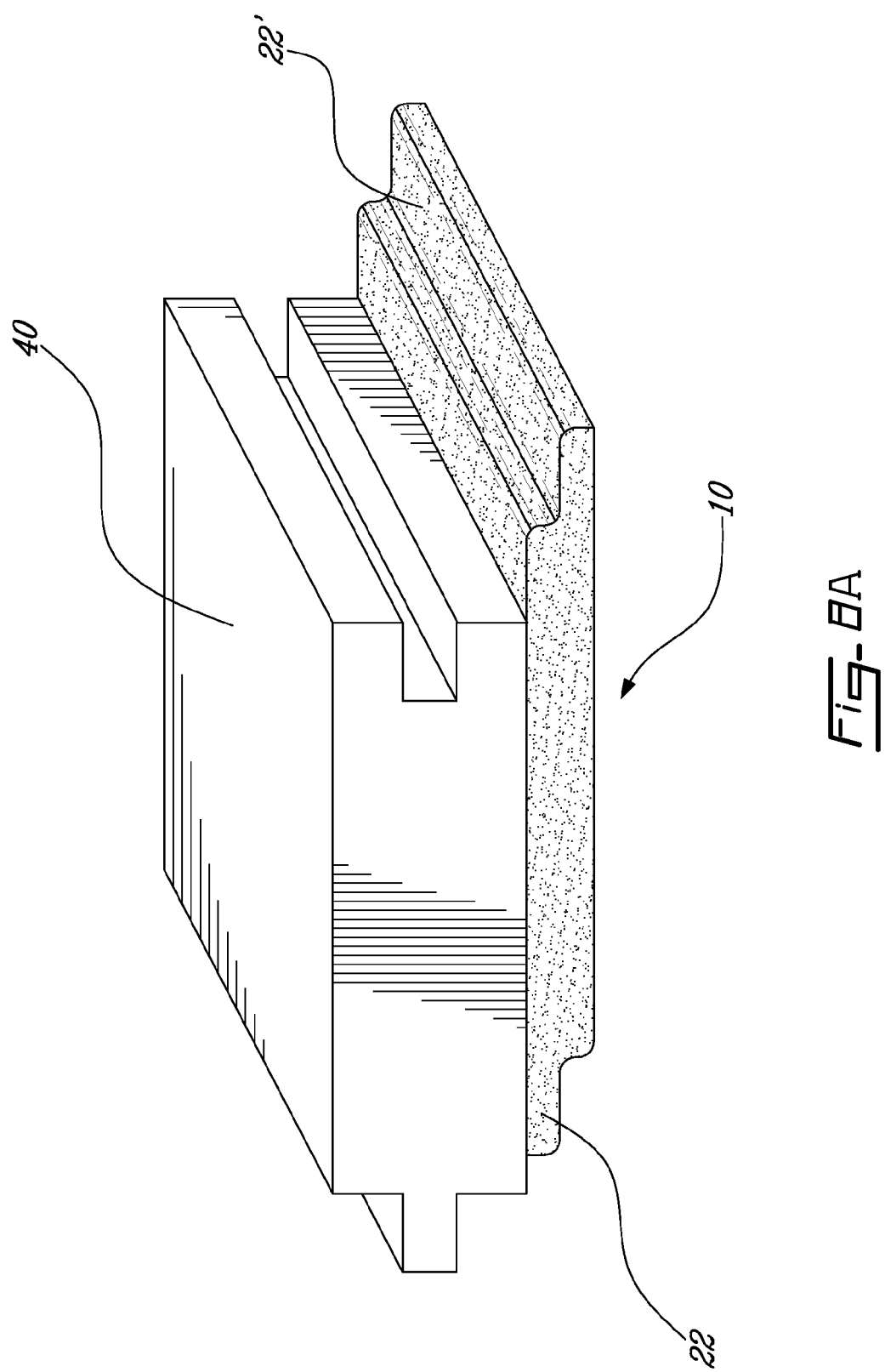
FIG. 8a is an end perspective view of a flexible moisture barrier membrane pre-installed to the bottom surface of a floor covering member, such as a wood plank.
Figure 8B:
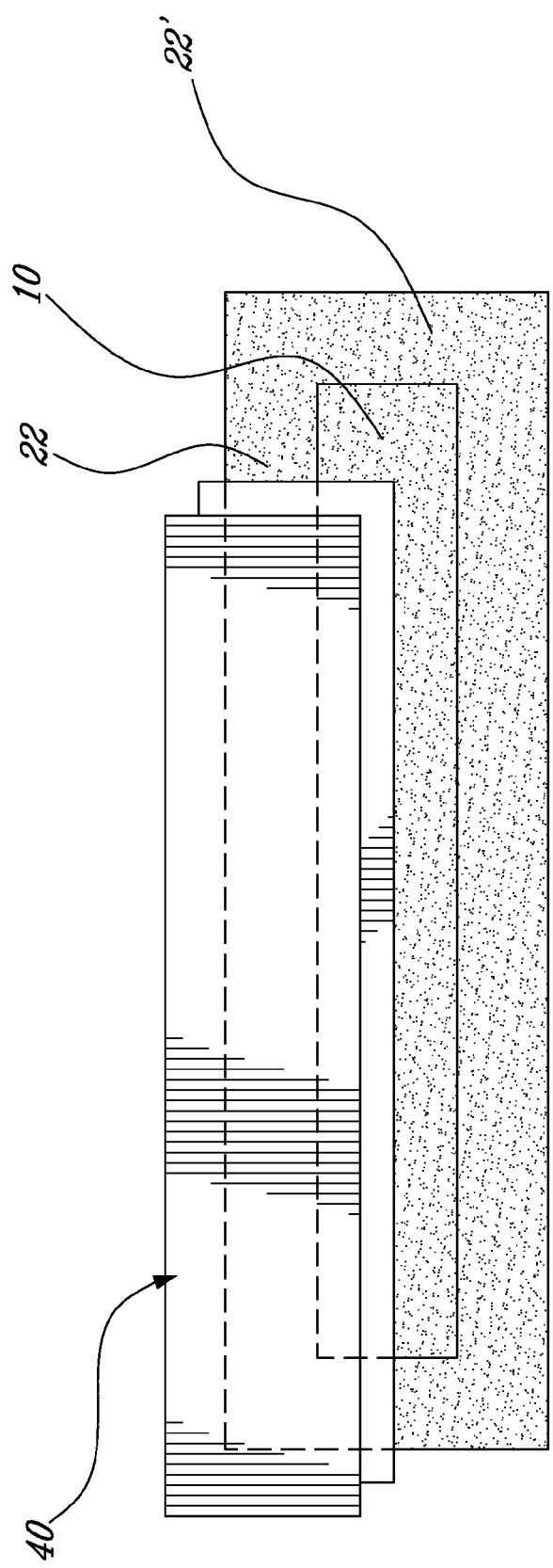

As shown in FIG. 8, it is contemplated to pre-install a strip of moisture barrier membrane (10) to the bottom surface of each floor board (40). The strip of moisture barrier membrane (10) extends beyond one longitudinal end of the floor board (40) as well as laterally outwardly from on side of the floor board (40) to expose an upwardly facing adjoining peripheral portions 22' of the membrane to be covered with corresponding downwardly facing adjoining side portions 22 of adjacent membranes secured underneath other floor boards (40) to be installed at the ends and at the sides of the illustrated board. The downwardly facing adjoining portion 22 does not project laterally outwardly from the associated floor board (40) and is adapted to be brought in overlapping relationship with the upwardly facing side 22' of another membrane and plank assembly when a pair of side-by-side boards (40) is assembled together.

According to an embodiment of the present invention, the membrane could be defined as a monolithic membrane (10) comprising at least one layer of bitumen or other such hydrophobic substance coated on one or two faces by one or several films (38) and or other material—reinforced or not,—offering or not peel-and-stick feature on either face for self-adhesive capability—and featuring or not zip strips, either on the full surface or on sections, wherein the membrane (10) is constructed with edges (20) of special shape, either on at least one side, which may be attached or not to the core layer (300) above, so that at least two superposed edges (20) of adjoining sections of membrane (10) can be knitted together easily by sensible pressure, action of flame or otherwise, the sections of membrane (10) so knitted forming a monolithic surface having waterproof, air/vapor proof and moisture barrier capabilities and on request fire retardant, without concern for the thickness, the width, the angle or the shape of either the edges (20) or the membrane (10) and without concern for any heatproof, soundproof, impact proof isolation or filling material added to the membrane (10) during manufacturing or installation, the monolithic surface formed thereafter offering a substantially flat and even surface ideal for use in support of floor, wall, ceilings or roofs application, wherein the surface features no bumps or knob preventing a normal use. Other indoor or outdoor applications of the membrane (10) cover notably top roofing layers, foundations, driveways, sidewalks, fire protections.

The term overlap joint is herein used to designate all type of joint wherein there is a superposition of material to prevent straight through infiltration along a straight seam at the junction of two membranes. Therefore, it does not necessarily imply that the adjacent membranes have overlapping portions. It is intended to cover the embodiment shown in FIG. 1b wherein the adjoining edges of the membranes are abutted in an end-to-end relationship and wherein the cavity defined thereby is filled with a liquid membrane (30) or covered by a layer of insulation material overlying the two thicknesswise reduced portions of the membranes.

It is noted that the above-described moisture barrier membrane (10) can be used with any type of floor covering and is not limited for use with wood board or planks. For instance, it could be installed underneath solid engineered wood, plastic, vinyl, ceramic, marble, or carpet covering to name a few.

Although, the present invention has been described in the context of a moisture barrier for floor and roof applications, it is noted that the no-bump overlap joint concept could also be applied to sound insulation membranes. In this case, the bituminous membrane would be replaced by a roll of foam sheet-like insulation material. The present invention could also be applied to rolls of vinyl floor covering as well as other types of flexible covering materials.

The invention claimed is:

1. A moisture barrier underlayment adapted to be installed on a subfloor to provide a substantially flat and level surface for receiving floor covering, comprising:

at least first and second strips of moisture barrier membranes laid down one next to the other in a coplanar relationship, said first and second strips having a thickness W1, an overlap joint between said first and second strips, said overlap joint having a thickness W2 substantially equal to or less than WI and providing a free-bump transition between said first and second strips while preventing straight-through moisture infiltration from the subfloor to the floor covering, and an intermediate layer of substantially rigid floor members adapted to be installed next to one another in a coplanar relationship atop of said strips of moisture barrier membranes, wherein longitudinal grooves are defined in said floor members to accommodate expansion and contraction movements, and wherein said longitudinal grooves include peripheral grooves defined along the side edge portions of the floor members to provide flexible abutting fingers between the floor members.

2. A moisture barrier underlayment as defined in claim 1, wherein said rigid floor members are spaced from one another to accommodate expansion and contraction movements of the floor covering.

3. A moisture barrier underlayment as defined in claim 1, wherein said floor members have softened bottom edges to prevent puncturing of the moisture barrier membranes.

4. A moisture barrier underlayment as defined in claim 1, wherein said first and second strips of moisture barrier membrane have adjoining side portions of reduced thicknesses.

5. A moisture barrier underlayment as defined in claim 1, wherein spring means are provided between adjacent floor members to accommodate contraction and expansion movements.

6. A moisture barrier underlayment adapted to be installed on a subfloor to provide a substantially flat and level surface for receiving floor covering, comprising:

at least first and second strips of moisture barrier membranes laid down one next to the other in a coplanar relationship, said first and second strips having a thickness W1, and an overlap joint between said first and second strips, said overlap joint having a thickness W2 substantially equal to or less than WI and providing a free-bump transition between said first and second strips while preventing straight-through moisture infiltration from the subfloor to the floor covering, and an intermediate layer of substantially rigid floor members adapted to be installed next to one another in a coplanar relationship atop of said strips of moisture barrier membranes, wherein longitudinal grooves are defined in said floor members to accommodate expansion and contraction movements, and wherein said longitudinal grooves include side-by-side grooves extending in succession in opposite directions from a top surface and a bottom surface of the floor members to provide a bellows formation in each of said floor members as a intra-floor member expansion/contraction accommodation means.

7. A moisture barrier underlayment as defined in claim 6, wherein said rigid floor members are spaced from one another to accommodate expansion and contraction movements of the floor covering.

8. A moisture barrier underlayment as defined in claim 6, wherein said floor members have softened bottom edges to prevent puncturing of the moisture barrier membranes.

9. A moisture barrier underlayment as defined in claim 6, wherein said first and second strips of moisture barrier membrane have adjoining side portions of reduced thicknesses.

10. A moisture barrier underlayment as defined in claim 6, wherein spring means are provided between adjacent floor members to accommodate contraction and expansion movements.

* * * * *